United States Patent
Ozawa

(10) Patent No.: US 7,249,834 B2
(45) Date of Patent: Jul. 31, 2007

(54) INKJET RECORDING INK AND INKJET RECORDING METHOD

(75) Inventor: Takashi Ozawa, Fujinomiya (JP)

(73) Assignee: FujiFilm Corporation, Tokyo (JP)

( * ) Notice: Subject to any disclaimer, the term of this patent is extended or adjusted under 35 U.S.C. 154(b) by 239 days.

(21) Appl. No.: 10/504,681

(22) PCT Filed: Feb. 12, 2003

(86) PCT No.: PCT/JP03/01439

§ 371 (c)(1),
(2), (4) Date: Aug. 13, 2004

(87) PCT Pub. No.: WO03/068873

PCT Pub. Date: Aug. 21, 2003

(65) Prior Publication Data

US 2005/0231574 A1    Oct. 20, 2005

(30) Foreign Application Priority Data

Feb. 13, 2002   (JP)   ............................. 2002-035334
Feb. 13, 2002   (JP)   ............................. 2002-035598

(51) Int. Cl.
*G01D 11/00* (2006.01)
(52) U.S. Cl. .................. 347/100; 347/95; 106/31.27
(58) Field of Classification Search ................ 347/100, 347/101, 95, 96; 106/31.6, 31.13, 31.27; 523/160
See application file for complete search history.

(56) References Cited

U.S. PATENT DOCUMENTS

| | | | |
|---|---|---|---|
| 3,287,470 A | 11/1966 | Pugin et al. | |
| 5,704,969 A | 1/1998 | Kanaya et al. | |
| 6,582,502 B2 | 6/2003 | Fujiwara | |
| 2002/0107301 A1* | 8/2002 | Yamanouchi et al. | ....... 523/160 |
| 2003/0117474 A1 | 6/2003 | Harada et al. | |
| 2003/0213405 A1 | 11/2003 | Harada et al. | |

FOREIGN PATENT DOCUMENTS

| | | |
|---|---|---|
| EP | 20161 A2 | 12/1980 |
| EP | 1 388 579 A2 | 11/2004 |
| EP | 1 473 332 A1 | 11/2004 |

(Continued)

OTHER PUBLICATIONS

International Search Report for PCT/JP03/01439 dated Mar. 25, 2003.
Supplementary Partial European Search Report dated Jun. 22, 2005.

*Primary Examiner*—Manish S. Shah
(74) *Attorney, Agent, or Firm*—Sughrue Mion, PLLC

(57) ABSTRACT

An inkjet recording ink comprising at least one magenta dye or cyan dye dissolved and/or dispersed in an aqueous medium, wherein a wavelength ($\lambda$max) at the maximum reflection density of the ink is in a specific wavelength range ($\lambda$ex) and a reflection density at the specific wavelength ($\lambda$er) longer than the $\lambda$Max is not more than x % of the maximum reflection density, the $\lambda$ex is from 530 to 580 nm, $\lambda$er is 600 nm and x is 50 in case of the magenta dye ink, and the $\lambda$ex is from 580 to 630 nm, $\lambda$er is 670 nm and x is 90 in case of the cyan dye ink.

19 Claims, 2 Drawing Sheets

FOREIGN PATENT DOCUMENTS

| | | |
|---|---|---|
| EP | 1 473 333 A1 | 11/2004 |
| JP | 55-161856 A | 12/1980 |
| JP | 61-36362 A | 2/1986 |
| JP | 2-212566 A | 8/1990 |
| JP | 09-170181 * | 6/1997 |
| JP | 9-170181 A | 6/1997 |
| JP | 11-504958 A | 5/1999 |
| JP | 2000-239584 A | 9/2000 |
| WO | WO 96/34916 A2 | 11/1996 |
| WO | WO 02/060994 A1 | 8/2002 |
| WO | WO 02/083662 A2 | 10/2002 |
| WO | WO 02/083795 A2 | 10/2002 |
| WO | WO 03/000811 A1 | 1/2003 |
| WO | WO 03/062324 A1 | 7/2003 |
| WO | WO 03/087231 A1 | 10/2003 |

* cited by examiner

INKJET RECORDING INK AND INKJET RECORDING METHOD

TECHNICAL FIELD

The present invention relates to an inkjet recording ink providing a recording image of high quality, being excellent in ejection stability and forming an image excellent in preservability, and an inkjet recording method using the ink.

BACKGROUND ART

Accompanying recent popularization of computers, an inkjet printer is widely used for printing letters or an image on paper, film, cloth or the like not only at offices but also at homes.

The inkjet recording method includes a system of ejecting a liquid droplet by applying a pressure from a piezoelectric element, a system of ejecting a liquid droplet by generating a bubble in the ink under heat, a system of using an ultrasonic wave, and a system of ejecting a liquid droplet by drawing with an electrostatic force. The ink used for such inkjet recording includes an aqueous ink, an oily ink and a solid (fusion-type) ink. Among these inks, an aqueous ink is predominating in view of production, handleability, odor, safety and the like.

The dye used in such an ink for inkjet recording is required to have high solubility in a solvent, enable high-density recording, provide good hue, exhibit excellent fastness to light, heat, air, water and chemicals, ensure good fixing property to an image-receiving material and less bleeding, give an ink having excellent storability, have high purity and no toxicity, and be available at a low cost. However, it is very difficult to find out a dye satisfying these requirements in a high level. In particular, a dye having good magenta hue or cyan hue and excellent in weather resistance has been desired.

Various dyes and pigments for inkjet recording have been already proposed and are actually used. However, a dye satisfying all requirements is not yet found out at present. Conventionally well-known dyes and pigments having a Colour Index (C.I.) number can hardly satisfy both hue and fastness required for the inkjet recording ink. As dyes improving fastness, azo dyes derived from aromatic amines and 5-membered heterocyclic amines as described in JP-A-55-161856 are proposed. Among these dyes, however, since magenta dyes have undesirable hues in yellow and cyan regions and cyan dyes have undesirable hues in yellow and magenta regions, these dyes have a problem of deteriorating color reproducibility. In JP-A-61-36362 and JP-A-2-212566, inkjet recording inks for the purpose of satisfying both hue and light fastness are disclosed. However, the dyes used therein are insufficient in solubility in water, when they are used in water-soluble inks. These dyes also have a problem of fastness to humidity and heat, when they are used in water-soluble inkjet inks. In order to resolve these problems, compounds and inks described in JP-T-11-504958 have been proposed. Also, in order to improve hue and light fastness, inkjet recording inks using pyrazolylanilineazo are described in Japanese Patent Application No. 2000-80733. However, these inkjet recording inks are insufficient in both color reproducibility and fastness of output image.

Moreover, it has been found that preservability of image is extremely poor, when recorded on exclusive inkjet gloss paper for photographic image quality and hung indoors. The present inventors estimate that this phenomenon results from oxidizing gas, for example, ozone in the air. Further, this phenomenon does not occur upon blocking air flow, for example, by means of putting it into a glass frame.

This phenomenon is especially prominent in the exclusive inkjet gloss paper for photographic image quality so that it is a big problem in the present inkjet recording system in which photographic image quality is one of the important features.

[LIST OF PATENT DOCUMENT ON PRIOR ART]

[Patent Document 1]
JP-A-55-161856
[Patent Document 2]
JP-A-61-36362
[Patent Document 3]
JP-A-2-212566
[Patent Document 4]
JP-T-11-504958

Therefore, an object to be resolved by the present invention is to provide an inkjet recording ink, which has high ejection stability, provides an image having good hue and excellent image preservability and improves the image preservability under severe conditions in aqueous inks in view of handleability, odor, safety and the like, and an inkjet recording method.

DISCLOSURE OF THE INVENTION

The object of the present invention can be attained by the following means.

1. An inkjet recording ink comprising at least one magenta dye or cyan dye dissolved and/or dispersed in an aqueous medium, wherein a wavelength ($\lambda$max) at the maximum reflection density of the ink is in a specific wavelength range ($\lambda$ex) and a reflection density at the specific wavelength ($\lambda$er) longer than the $\lambda$max is not more than x % of the maximum reflection density, the $\lambda$ex is from 530 to 580 nm, $\lambda$er is 600 nm and x is 50 in case of the magenta dye ink, and the $\lambda$ex is from 580 to 630 nm, $\lambda$er is 670 nm and x is 90 in case of the cyan dye ink.

2. The inkjet recording ink as described in item 1, wherein the ink comprises at least one magenta dye dissolved and/or dispersed in an aqueous medium, the $\lambda$ex is from 530 to 580 nm, $\lambda$er is 600 nm and x is 50.

3. The inkjet recording ink as described in item 2, wherein the $\lambda$ex is from 540 to 570 nm, $\lambda$er is 600 nm and x is 45.

4. The inkjet recording ink as described in item 3, wherein the $\lambda$ex is from 540 to 570 nm, $\lambda$er is 600 nm and x is 20.

5. The inkjet recording ink as described in item 1, wherein the ink comprises at least one cyan dye dissolved and/or dispersed in an aqueous medium, the $\lambda$ex is from 580 to 630 nm, $\lambda$er is 670 nm and x is 90.

6. The inkjet recording ink described in item 5, wherein the $\lambda$ex is from 585 to 615 nm, $\lambda$er is 670 nm and x is 85.

7. The inkjet recording ink as described in item 6, wherein the $\lambda$ex is from 585 to 615 nm, $\lambda$er is 670 nm and x is 65.

8. The inkjet recording ink as described in any one of items 1 to 4, wherein the dye is an azo dye having the absorption maximum in a spectral range of from 500 to 580 nm in the aqueous medium and an oxidation potential more positive than 1.0 V (vs SCE).

9. The inkjet recording ink as described in any one of items 1 to 4 and 8, wherein the azo dye has a chromophore represented by the following formula:

(heterocyclic ring A)-N=N-(heterocyclic ring B).

The inkjet recording ink as described in any one of items 1 to 4, 8 and 9, wherein the azo dye is an azo dye in which an aromatic nitrogen-containing 6-membered heterocyclic ring is bonded as the coupling component directly to at least one side of the azo group.

11. The inkjet recording ink as described in any one of items 1 to 4 and 8 to 10, wherein the azo dye is an azo dye having as an auxochrome, a structure containing an aromatic cyclic amino group or a heterocyclic amino group.
12. The inkjet recording ink as described in any one of items 1 to 4 and 8 to 11, wherein the azo dye is an azo dye having a steric structure.
13. The inkjet recording ink as described in any one of items 1 to 4 and 8 to 12, wherein the azo dye is a dye represented by the following formula (1):

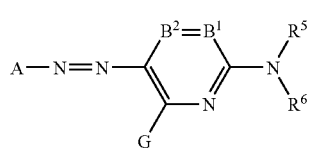

Formula (1)

wherein A represents a 5-membered heterocyclic group, $B^1$ and $B^2$ each represents $=CR^1-$ or $-CR^2=$ or either one of $B^1$ and $B^2$ represents a nitrogen atom and the other represents $=CR^1-$ or $-CR^2=$, $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, the hydrogen atom of each substituent may be substituted, G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, the hydrogen atom of each substituent may be substituted, and $R^1$ and $R^5$, or $R^5$ and $R^6$ may combine to form a 5- or 6-membered ring.

14. The inkjet recording ink as described in any one of items 1 to 4 and 8 to 13, wherein an ozone discoloration rate constant of a recording image is not more than $5.0 \times 10^{-2}$ [$hr^{-1}$].
15. The inkjet recording ink as described in any one of items 1 and 5 to 7, wherein the dye is a water-soluble phthalocyanine dye having an oxidation potential more positive than 1.0 V.
16. The inkjet recording ink as described in any one of items 1, 5 to 7 and 15, wherein after storage in an ozone environment of 5 ppm for 24 hours, the monochromatic site printed by using a monochrome (cyan) ink to give a cyan reflection density of 0.9 to 1.1 by a Status A filter has a dye remaining ratio (density after discoloration/initial density×100) of 60% (preferably 80%) or more.
17. The inkjet recording ink as described in any one of items 1, 5 to 7 and 15 to 16, wherein after the ozone discoloration under the conditions of item 16, an amount of Cu ion flowed out into water is 20% or less of all dyes.
18. The inkjet recording ink as described in any one of items 1, 5 to 7 and 15 to 17, wherein the phthalocyanine dye is a water-soluble phthalocyanine dye having an electron-withdrawing group at a β-position of a benzene ring of the phthalocyanine.
19. The inkjet recording ink as dwescribed in any one of items 1, 5 to 7 and 15 to 18, wherein the phthalocyanine dye is a water-soluble phthalocyanine dye produced by a method not passing through sulfonation of an unsubstituted phthalocyanine.
20. The inkjet recording ink as described in any one of items 1, 5 to 7 and 15 to 19, wherein the phthalocyanine dye is a dye represented by the following formula (I):

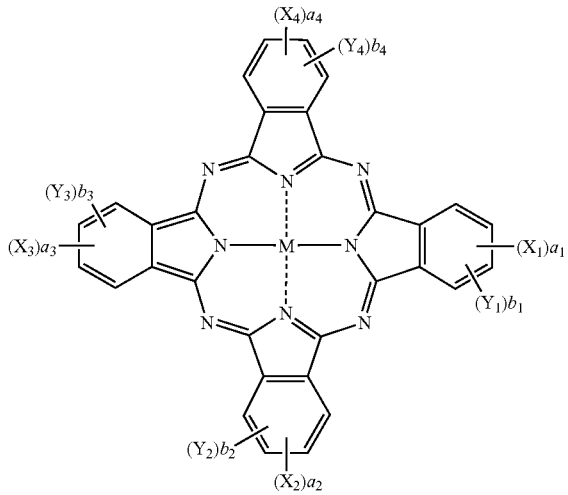

Formula (I)

wherein $X_1$, $X_2$, $X_3$ and $X_4$ each independently represents $-SO-Z$, $-SO_2-Z$, $-SO_2NR1R2$, a sulfo group, $-CONR1R2$ or $-CO_2R1$, Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, the Zs may be the same or different, $Y_1$, $Y_2$, $Y_3$ and $Y_4$ each independently represents a monovalent substituent, provided that when a plurality of substituents $X_1$, $X_2$, $X_3$, $X_4$, $Y_1$, $Y_2$, $Y_3$ or $Y_4$ are present, the $X_1$s, $X_2$s, $X_3$s, $X_4$s, $Y_1$s, $Y_2$s, $Y_3$s or $Y_4$s may be the same or different, $a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4, provided that all are not 0 at the same time, $b_1$ to $b_4$ each independently represents an integer of 0 to 4, and M represents a hydrogen atom, a metal atom or an oxide, hydroxide or halide thereof.

The inkjet recording ink as described in item 20, wherein the dye represented by formula (I) is a dye represented by the following formula (II):

Formula (II)

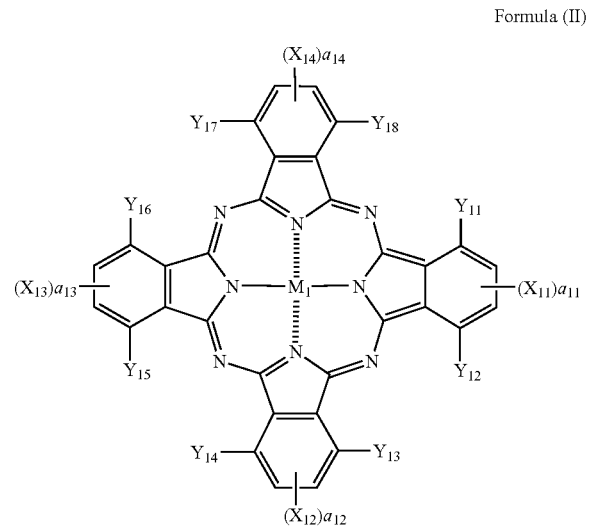

Formula (II)

wherein $X_{11}$ to $X_{14}$, $Y_{11}$ to $Y_{18}$ and $M_1$ have the same meanings as $X_1$ to $X_4$, $Y_1$ to $Y_4$ and M in formula (I), respectively, and $a_{11}$ to $a_{14}$ each independently represents an integer of 1 or 2.

22. An inkjet recording method comprising conducting image recording by a inkjet printer using the inkjet recording ink as described in any one of items 1 to 21.

23. The inkjet recording method as described in item 22, which comprises ejecting an ink droplet according to recording signals on an image-receiving material comprising a support having thereon an image-receiving layer containing a white inorganic pigment particle to record an image on the image-receiving material, wherein the ink droplet comprises the inkjet recording ink as described in any one of items 1 to 21.

BEST MODE FOR CARRYING OUT THE INVENTION

Figure 1:
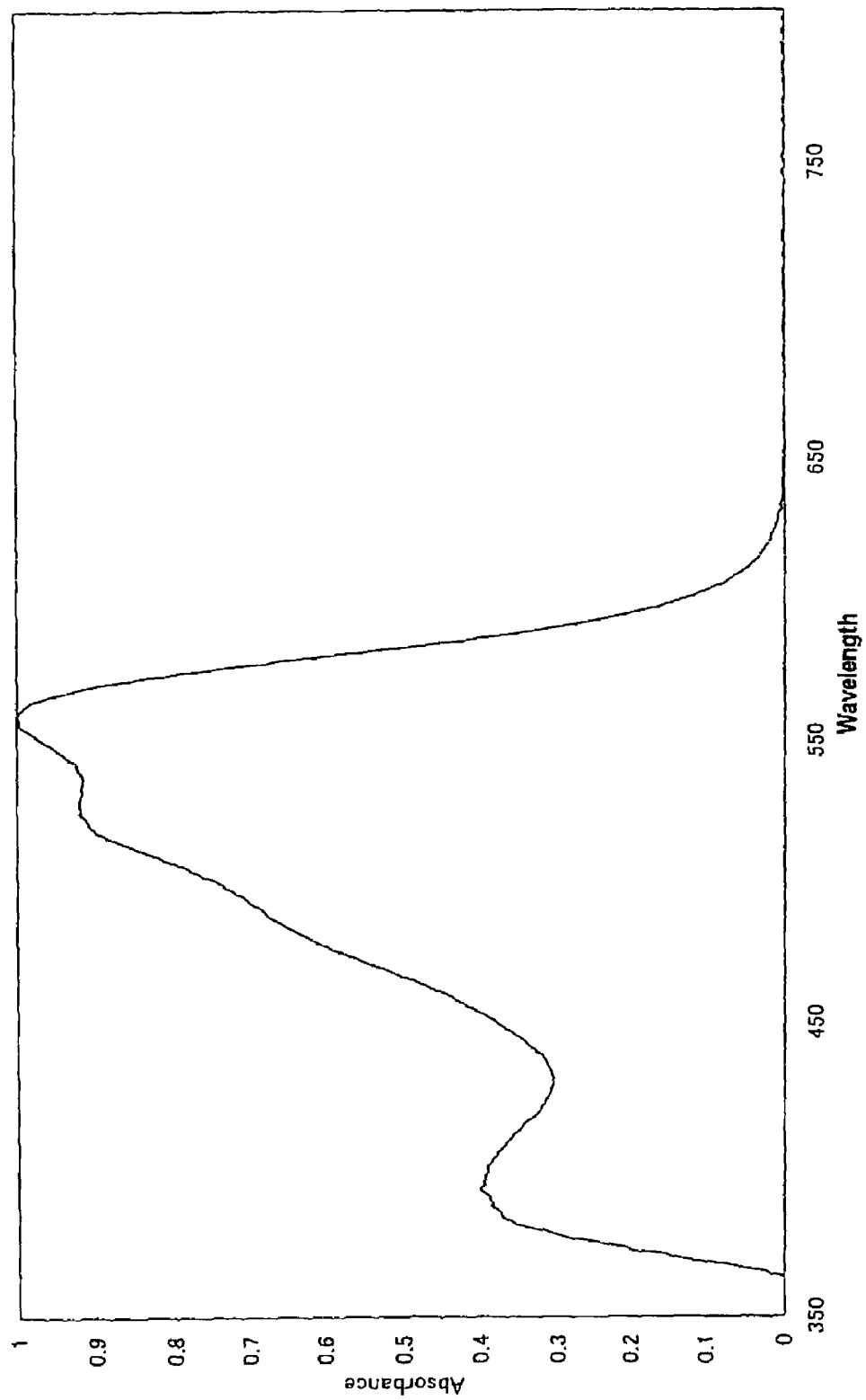
FIG. 1. is a diagram showing reflection absorption characteristics of a magenta solid image of Ink Set 101.

Specific embodiments of the present invention will be described in detail below.

An azo dye for the magenta dye is described in more detail below.

The azo dye for the magenta dye preferably has the following characteristics.

In the magenta ink used for the inkjet recording ink of the present invention, a magenta dye selected from azo dyes is dissolved or dispersed in an aqueous medium and the dye is fundamentally characterized in that the absorption maximum in the aqueous medium is present in the spectral region of 500 to 580 nm and the oxidation potential is more positive than 1.0 V (vs SCE).

The first preferred structural feature of the azo dye is that the dye has a chromophore represented by the formula: (heterocyclic ring A)-N=N-(heterocyclic ring B). In this case, the heterocyclic rings A and B may have the same structure. Specifically, the heterocyclic rings A and B each is a 5- or 6-membered heterocyclic ring selected from pyrazole, imidazole, triazole, oxazole, thiazole, selenazole, pyridone, pyrazine, pyrimidine and pyridine. Specific examples thereof are described, for example, in Japanese Patent Application Nos. 2000-15853, 2001-15614, 2002-309116 and 2001-195014.

The second preferred structural feature of the azo dye is that an aromatic nitrogen-containing 6-membered heterocyclic ring is bonded as the coupling component directly to at least one side of the azo group. Specific examples thereof are described in Japanese Patent Application No. 2001-110457.

The third preferred structural feature is that the auxochrome has a structure of an aromatic cyclic amino group or a heterocyclic amino group structure, specifically, an anilino group or a heterylamino group.

The fourth preferred structural feature is that the dye has a steric structure. Specific examples thereof are described in Japanese Patent Application No. 2002-12015.

Among these preferred structural features of the azo dye, the dye most preferred for attaining the object of the present invention is a dye represented by the following formula (1).

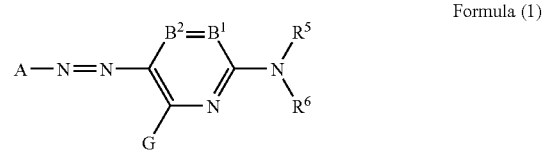

Formula (1)

In formula (1), A represents a 5-membered heterocyclic group, $B^1$ and $B^2$ each represents =$CR^1$— or —$CR^2$= or either one of $B^1$ and $B^2$ represents a nitrogen atom and the other represents =$CR^1$— or —$CR^2$=, $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, the hydrogen atom of each substituent may be substituted, G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, the hydrogen atom of each substituent may be substituted, and $R^1$ and $R^5$, or $R^5$ and $R^6$ may combine to form a 5- or 6-membered ring.

The dye of formula (1) is described in more detail below.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring of A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among those rings, more preferred are a pyrazole ring, an imidazole ring, an isothiazole ring, a thiadiazole ring and a benzothiazole ring represented by formulae (a) to (f) shown below.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring of A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among those rings, more preferred are a pyrazole ring, an imidazole ring, an isothiazole ring, a thiadiazole ring and a benzothiazole ring represented by formulae (a) to (f) shown below.

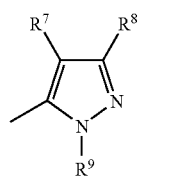

Formula (a)

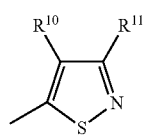

(b)

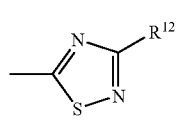

(c)

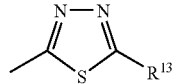

(d)

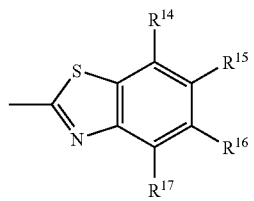

(e)

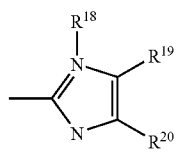

(f)

In formulae (a) to (f), $R^7$ to $R^{20}$ represent the same substituents as G, $R^1$ and $R^2$ in formula (1) respectively.

Among formulae (a) to (f), preferred are a pyrazole ring and an isothiazole ring represented by formulae (a) and (b), and most preferred is a pyrazole ring represented by formula (a).

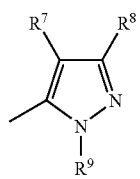

Formula (a)

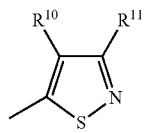

(b)

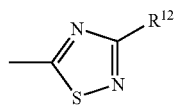

(c)

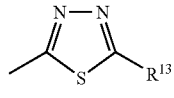

(d)

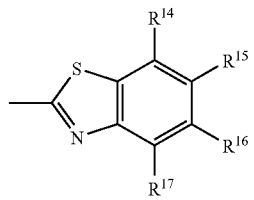

(e)

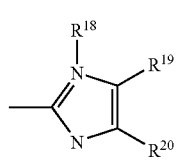

(f)

In formula (1), $B^1$ and $B^2$ each represents =CR$^1$— or —CR$^2$= or either one of $B^1$ and $B^2$ represents a nitrogen atom and the other represents =CR$^1$— or —CR$^2$=. B$^{31}$ and B$^{32}$ each preferably represents =CR$^1$— or —CR$^2$=.

R$^5$ and R$^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

R$^5$ and R$^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but both R$^5$ and R$^6$ are not hydrogen atoms at the same time.

G, R$^1$ and R$^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

R$^1$ and R$^2$ each is preferably a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

R$^1$ and R$^5$, or R$^5$ and R$^6$ may combine to form a 5- or 6-membered ring.

When A has a substituent or when the substituent R$^1$, R$^2$, R$^5$, R$^6$ or G further has a substituent, examples of the substituent include the substituents described above for G, R$^1$ and R$^2$.

In the case where the dye of formula (1) of the present invention is a water-soluble dye, the dye preferably further contains an ionic hydrophilic group as a substituent on any position of A, R$^1$, R$^2$, R$^5$, R$^6$ and G. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include an ammonium ion, alkali metal ions (e.g., lithium ion, sodium ion, potassium ion) and organic cations (e.g., tetramethylammonium ion, tetramethylguanidium ion, tetramethylphosphonium).

The term "substituent" as used in the present invention is described below. The terms each is common among different symbols in formula (1) and also in formula (1a) shown below.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" used for a "substituted alkyl group" and the like in the present invention means that the hydrogen atom present in an "alkyl group" or the like is substituted, for example, with a substituent described above for G, R$^1$ and R$^2$.

The aliphatic group may be branched or may form a ring. The number of carbon atoms in the aliphatic group is preferably from 1 to 20, more preferably from 1 to 16. The aryl moiety in the aralkyl group and the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent include an alkyl group, a halogen atom and an ionic hydrophilic group.

The acylamino group includes a substituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 7 to 20 carbon atoms, respectively. Examples of the substituent include an ionic hydrophilic group. Examples of the alkylsulfonylamino group and arylsulfonylamino group include a methylsulfonylamino group, an N-phenyl-methylsulfonylamino group, a phenylsulfonylamino group and a 3-carboxyphenylsulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group and a di-(2-hydroxyethyl)sulfamoyl group.

Of the dyes represented by formula (1), particularly preferred is a structure represented by the following formula (1a):

Formula (1a):

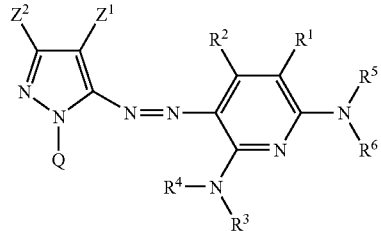

In formula (1a), $R^1$, $R^2$, $R^5$ and $R^6$ have the same meanings as in formula (1) respectively.

$R^3$ and $R^4$ each independently represents a hydrogen atom or a substituent and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (1a) may be substituted. Examples of the substituent include the substituents described in regard to formula (1), the groups described as examples for G, $R^1$ and $R^2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo Co., Ltd. (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention include those which are not a benzene derivative, the σp value is used as a measure for showing the electron effect of the substituent irrespective of the substitution site. In the present invention, the σp value is used in this meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (1) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is $=CR^1-$ or $-CR^2=$, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are set forth in Tables 1 to 13 below, however, the azo dye for use in the present invention is not limited to those set forth below.

TABLE 1

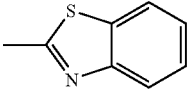

| DYE | $R_1$ | $R_2$ | $R_3$ |
|---|---|---|---|
| a-1 |  | —⟨ ⟩—$C_8H_{17}$ | —⟨ ⟩—$C_8H_{17}$ |

TABLE 1-continued

[Structure: pyrazole-azo-pyridine dye with tert-butyl and CN on pyrazole (N-R₁), CH₃ and CN on pyridine ring, NHR₂ and NHR₃ substituents]

| DYE | R₁ | R₂ | R₃ |
|---|---|---|---|
| a-2 | 2-methyl-5-chlorobenzothiazol-yl | 4-C₈H₁₇-phenyl | 2,3,5-trimethylphenyl |
| a-3 | 2-methyl-6-chlorobenzothiazol-yl | 2,3,5-trimethylphenyl | 4-C₈H₁₇-phenyl |
| a-4 | 2-methylbenzothiazol-yl | 2-OC₈H₁₇-phenyl | 4-C₈H₁₇-phenyl |
| a-5 | 2-methyl-5-nitrobenzothiazol-yl | 2,4-dimethylphenyl | 2,4-dimethylphenyl |

TABLE 2

[Structure: similar pyrazole-azo-pyridine dye as above]

| DYE | R₁ | R₂ | R₃ |
|---|---|---|---|
| a-6 | 2-methylbenzothiazol-6-yl-SO₂NH-(CH₂)₃-O-[2,4-di-tert-pentylphenyl] | 4-CH₃-phenyl | 4-CH₃-phenyl |

TABLE 2-continued

| DYE | R₁ | R₂ | R₃ |
|---|---|---|---|
| a-7 | 2-methylbenzothiazol-6-yl-SO₂NH-(CH₂)₃-OCH₂CH(C₈H₁₇)(C₆H₁₃) | 2,3,5-trimethylphenyl | 4-methylphenyl |
| a-8 | 2-methylbenzothiazol-6-yl-NHCOCH(Et)-O-(2,4-di-tert-pentylphenyl) | 4-octylphenyl | 4-octylphenyl |
| a-9 | 2-methylbenzothiazol-6-yl-NHSO₂-(2-(n)C₈H₁₇O-5-C₈H₁₇(t)-phenyl) | 2,3,5-trimethylphenyl | 4-C₈H₁₇(t)-phenyl |
| a-10 | 2-methyl-5-chlorobenzothiazol-6-yl | 2-OC₁₂H₂₅-phenyl | 2-OC₁₂H₂₅-phenyl |

TABLE 3

| DYE | R₁ | R₂ | R₃ | R₄ |
|---|---|---|---|---|
| a-11 | tert-butyl | 2-methylbenzothiazol-6-yl-SO₂Na | 4-methylphenyl | 4-SO₃Na-phenyl |

TABLE 3-continued
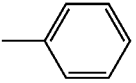
| DYE | R₁ | R₂ | R₃ | R₄ |
|---|---|---|---|---|
| a-12 | 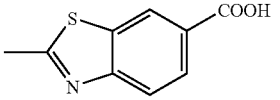 | 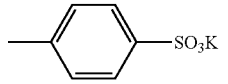 | 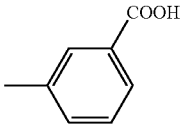 | 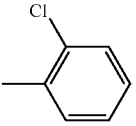 |
| a-13 | 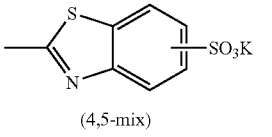 | 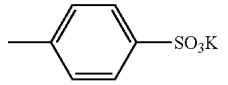 (4,5-mix) | 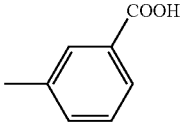 | 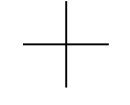 |
| a-14 | 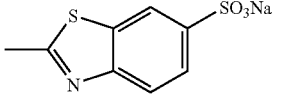 | 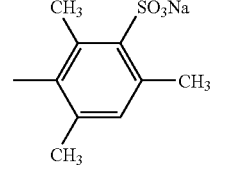 | 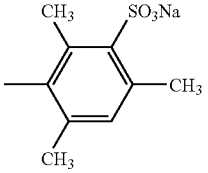 | 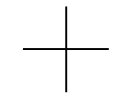 |
| a-15 | 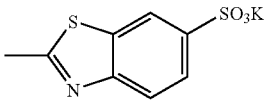 | 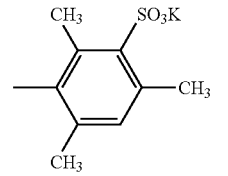 | 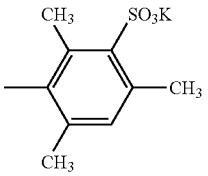 | 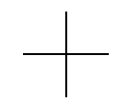 |
| a-16 | 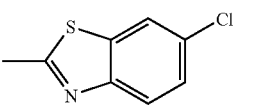 | 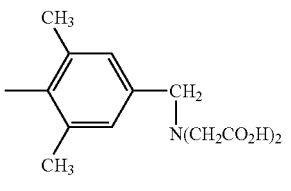 | 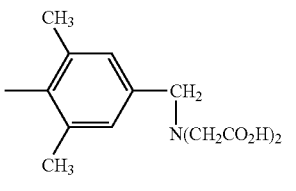 | 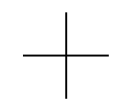 |
| a-17 | 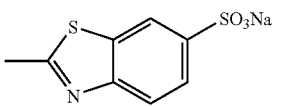 | 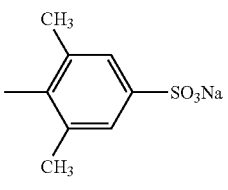 | 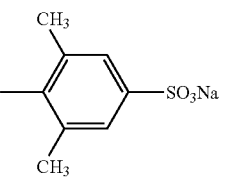 | |

TABLE 4

[Structure: pyrazole with tert-butyl and CN groups, N-R₁, connected via N=N azo linkage to a pyridine bearing CH₃, NR₂R₃, and NH-R₄ substituents]

| DYE | R₁ | R₂ | R₃ | R₄ |
|---|---|---|---|---|
| a-18 | 2-benzothiazolyl | 2-benzothiazolyl | 2,4,5-trimethylphenyl | 2,4,5-trimethylphenyl |
| a-19 | 5-chloro-2-benzothiazolyl | —SO₂CH₃ | 2,4,5-trimethylphenyl | 4-methylphenyl |
| a-20 | 2-benzothiazolyl | —COCH₃ | C₈H₁₇(t) | C₈H₁₇(t) |
| a-21 | 6-chloro-2-benzothiazolyl | —SO₂CH₃ | 2,4-dimethylphenyl | C₈H₁₇(t) |
| a-22 | 2-benzothiazolyl | H | 2,4,5-trimethylphenyl | 2,4,5-trimethylphenyl |
| a-23 | 2-benzothiazolyl | H | 2,3-dimethylphenyl | 2,3-dimethylphenyl |
| a-24 | 2-benzothiazolyl | H | 2,3-dimethylphenyl | 2,3-dimethylphenyl |
| a-25 | 2-benzoxazolyl | 2-benzoxazolyl | 2,4,5-trimethylphenyl | 2,4,5-trimethylphenyl |

TABLE 5

| DYE | R₁ | R₂ | R₃ | R₄ |
|---|---|---|---|---|
| a-26 | 2-methylbenzothiazol-6-yl | 2-(2,4-di-tert-pentylphenoxy)propyl-SO₂NH-(2-methylbenzothiazol-6-yl) | 2,4,6-trimethylphenyl | 2,4,6-trimethylphenyl |
| a-27 | 2-(2,4-di-tert-pentylphenoxy)propyl-SO₂NH-(2-methylbenzothiazol-6-yl) | 2-(2,4-di-tert-pentylphenoxy)propyl-SO₂NH-(2-methylbenzothiazol-6-yl) | 2,4,6-trimethylphenyl | 2,4,6-trimethylphenyl |
| a-28 | 5-chloro-2-methylbenzothiazol-6-yl | 2-(2,4-di-tert-pentylphenoxy)-N-ethyl-acetamido-(2-methylbenzothiazol-6-yl) | 2,4-dimethylphenyl | 2,4-dimethylphenyl |

Core structure:

pyrazole–azo–pyridine dye with CN and tert-butyl on pyrazole (N–R₁), H₃C on pyridine, and –NR₂, =N–R₃, –NHR₄ substituents on the pyridine ring.

TABLE 5-continued

| DYE | R₁ | R₂ | R₃ | R₄ |
|---|---|---|---|---|
| a-29 | 2-methylbenzothiazol-6-yl | 2-methylbenzothiazol-6-yl | 2-dodecyloxy-methylphenyl (OC₁₂H₂₅, CH₃) | 2-dodecyloxy-methylphenyl (OC₁₂H₂₅, CH₃) |
| a-30 | 5-nitro-2-methylbenzothiazol-6-yl | 2,5-di(octyloxy)-phenyl with NHSO₂ substituent ((nC₈H₁₇O-, OC₈H₁₇(t), NHSO₂-)) | 4-(C₈H₁₇)phenyl | 2-(C₈H₁₇(t))phenyl |
| a-31 | 2-methylbenzoxazol-6-yl with SO₂NHCH₂CH(C₂H₅)C₄H₉ | 2-methylbenzoxazol-6-yl with SO₂NHCH₂CH(C₂H₅)C₄H₉ | 2,3-dimethylphenyl (CH₃, CH₃) | 2-methylphenyl (CH₃) |

(Structure shown at top of table: pyrazole-azo-pyridine dye core with CN, t-Bu, H₃C, R₁, R₂, R₃, R₄ substituents)

TABLE 6
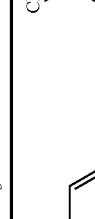
| DYE | R1 | R2 | R3 | R4 |
|---|---|---|---|---|
| a-32 | 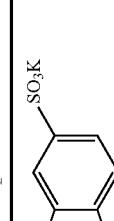 |  | 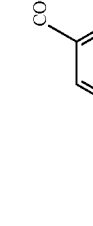 | 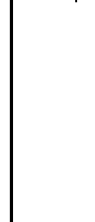 |
| a-33 | 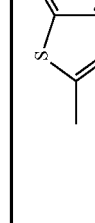 |  |  | 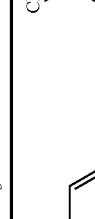 |
| a-34 | 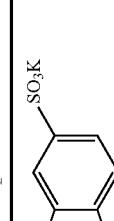 (5,6-mix) |  (5,6-mix) | 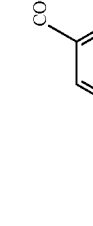 | |

TABLE 6-continued

| DYE | | R₁ | R₂ | R₃ | R₄ |
|---|---|---|---|---|---|
| a-35 | (structure: pyrazole with CN, t-Bu, R₁; azo-linked pyridine with H₃C, NR₂R₃, NHR₄) | 2-methylbenzothiazol-5/6-yl-SO₃Na (5,6-mix) | 3,5-di(COOH)phenyl-SO₂NH-(2-methylbenzothiazol-5/6-yl) (5,6-mix) | 4-methylphenyl | 2,6-dimethylphenyl (with CH₃) |

TABLE 7

[Structure shown: pyrazole-azo-pyridine dye with substituents R1, R2, R3, R4; pyrazole bearing CN and tert-butyl groups; pyridine bearing CH3 and two NH-linked R3, R4 groups via N-R2 substitution]

| DYE | R₁ | R₂ | R₃ | R₄ |
|---|---|---|---|---|
| a-36 | 2-methylbenzothiazol-6-yl, SO₃Na | 2-methylbenzothiazol-6-yl, SO₃Na | 2,3,5-trimethylphenyl, 4-SO₃Na | 2,3,5-trimethylphenyl, 4-SO₃Na |
| a-37 | 3,5-bis(COOK)phenyl-SO₂NH- (benzothiazol-6-yl, 2-methyl) | 2-methylbenzothiazol-6-yl | 2,3,5-trimethylphenyl, 4-SO₃K | 2,3,5-trimethylphenyl, 4-SO₃K |
| a-38 | 2-methylbenzothiazol-6-yl, SO₃Li | 2-methylbenzothiazol-6-yl, SO₃Li | 3,5-dimethylphenyl, 4-SO₃Li | 3,5-dimethylphenyl, 4-SO₃Li |
| a-39 | 2-methylbenzothiazol-6-yl, SO₃Na | 2-methylbenzothiazol-6-yl, SO₃Na | 3,5-dimethylphenyl-CH₂-N(CH₂COOH)₂ | 3,5-dimethylphenyl-CH₂-N(CH₂COOH)₂ |

TABLE 7-continued
| DYE | R1 | R2 | R3 | R4 |
|---|---|---|---|---|
| a-40 | 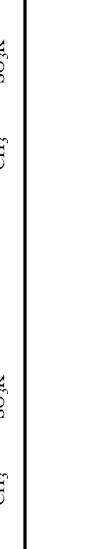 |  | 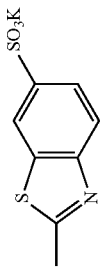 | 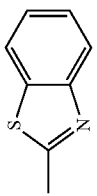 |

TABLE 8
| DYE | R₁ | R₂ | R₃ | R₄ | R₅ | R₆ | R₇ | R₈ |
|---|---|---|---|---|---|---|---|---|
| a-41 |  | CN |  | H | CONH₂ | SO₂CH₃ |  |  |
| a-42 |  | Br |  | COOEt | H |  | C₈H₁₇(t) | COCH₃ |
| a-43 |  | SO₂CH₃ |  | CONH₂ | H |  |  |  |
| a-44 |  | CN |  | H | H |  |  | SO₂CH₃ |

TABLE 8-continued

| DYE | R₁ | R₂ | R₃ | R₄ | R₅ | R₆ | R₇ | R₈ |
|---|---|---|---|---|---|---|---|---|
| a-45 | t-Bu | Br | 3,5-dichloro-4-methylphenyl | H | CONH₂ | OC(=O)CH₃ | 3,5-dimethyl-4-methylphenyl (mesityl) | 4-C₈H₁₇-phenyl |
| a-46 | t-Bu | CN | 2-methylbenzothiazol-yl | CH₃ | H | 2-methylbenzothiazol-yl | 3,5-diethyl-4-methylphenyl | 3,5-diethyl-4-methylphenyl |

TABLE 9

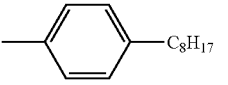

| DYE | R₁ | R₂ | R₃ | R₄ | R₅ | R₆ |
|---|---|---|---|---|---|---|
| b-1 | $CH_3$ | $CH_3$ | CN | H | 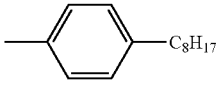 4-$C_8H_{17}$-phenyl | 4-$C_8H_{17}$-phenyl |
| b-2 | $CH_3$ | $CH_3$ | CN | H | 2,4,5-tri$CH_3$-phenyl | 2,4,5-tri$CH_3$-phenyl |
| b-3 | $CH_3$ | $CH_3$ | $CONH_2$ | H | 4-$C_8H_{17}$-phenyl | 2,4,5-tri$CH_3$-phenyl |
| b-4 | $CH_3$ | $CH_3$ | H | H | 2,3,4,6-tetra$CH_3$-5-$SO_3Li$-phenyl | 2,3,4,6-tetra$CH_3$-5-$SO_3Li$-phenyl |
| b-5 | $CH_3$ | H | CN | H | 4-$SO_3Na$-phenyl | 4-$SO_3Na$-phenyl |

TABLE 10

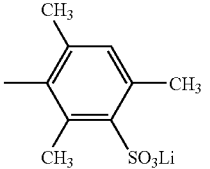

| DYE | R₁ | R₂ | R₃ | R₄ | R₅ | R₆ |
|---|---|---|---|---|---|---|
| b-6 | $CH_3$ | $CH_3$ | H | benzothiazol-2-yl | 2,4,6-tri$CH_3$-3-$CH_2N(CH_2CO_2K)_2$-phenyl | 2,4,6-tri$CH_3$-3-$CH_2N(CH_2CO_2K)_2$-phenyl |

TABLE 10-continued
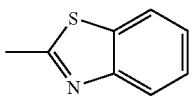
| DYE | R₁ | R₂ | R₃ | R₄ | R₅ | R₆ |
|---|---|---|---|---|---|---|
| b-7 | CH₃ | CH₃ | H | 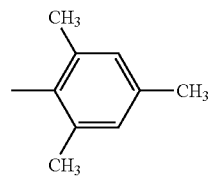 | 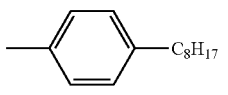 | 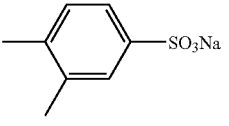 |
| b-8 | CH₃ | H | H | SO₂CH₃ | 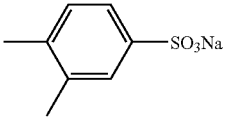 | 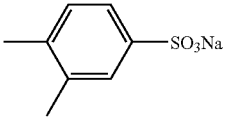 |

TABLE 11

| DYE | R1 | R2 | R3 | R4 | R5 | R6 |
|---|---|---|---|---|---|---|
| c-1 | —SCH₃ | CH₃ | CN | H | C₈H₁₇(t)-phenyl | 4-C₈H₁₇-phenyl |
| c-2 | 4-methylphenyl | H | CONH₂ | H | 4-SO₃K-phenyl | 4-SO₃K-phenyl |
| c-3 | KO₃S-CH₂CH₂-S-CH₃ | CH₃ | H | 2-methyl-6-SO₃K-benzothiazol-yl | 4-SO₃K-phenyl | 4-SO₃K-phenyl |
| c-4 | —CH₃ | CH₃ | H | 2-methyl-6-[SO₂NH(CH₂)₃O-(2,4-di-tert-amylphenyl)]-benzothiazol-yl | 2,4,6-trimethylphenyl | 4-C₈H₁₇-phenyl |
| c-5 | 4-methylphenyl | H | H | 2-methyl-6-[NHSO₂-(2-OC₈H₁₇(n)-5-C₈H₁₇(n)-phenyl)]-benzothiazol-yl | 2,4,6-trimethylphenyl | C₈H₁₇(t) |

TABLE 12

Structure: R¹-substituted 1,3,4-thiadiazol-2-yl-N=N-pyridine with R², R³, R⁴, R⁵, R⁶ substituents (NHR⁶ and NR⁴R⁵ groups on pyridine)

| DYE | R₁ | R₂ | R₃ | R₄ | R₅ | R₆ |
|---|---|---|---|---|---|---|
| d-1 | Me | CH₃ | CN | H | 4-(SO₃K)-C₆H₄- | 4-(SO₃K)-C₆H₄- |
| d-2 | Me | CH₃ | CN | H | 2,6-diethyl-4-methylphenyl | 2,6-diethyl-4-methylphenyl |
| d-3 | Me | H | H | 2-methylbenzothiazol-2-yl | 2,4,6-trimethyl-3-SO₃K-phenyl | 2,4,6-trimethyl-3-SO₃K-phenyl |
| d-4 | Ph | CH₃ | CONH₂ | H | 4-C₈H₁₇-C₆H₄- | 4-C₈H₁₇-C₆H₄- |
| d-5 | Ph | CH₃ | H | 2-methylbenzothiazol-6-yl-SO₂NH-(CH₂)₃-O-(2,4-di-tert-pentylphenyl) | 4-(OC₄H₉(n))-C₆H₄- | 2,6-diethyl-4-methylphenyl |

TABLE 13

Structure: R¹-substituted benzothiazol-2-yl-N=N-pyridine (benzothiazole positions 4,5,6,7 indicated) with R², R³, R⁴, R⁵, R⁶ substituents

| DYE | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |

TABLE 13-continued

| DYE | R₁ | R₂ | R₃ | R₄ | R₅ | R₆ |
|---|---|---|---|---|---|---|
| e-2 | 5,6-diCl | H | H | 2-benzothiazolyl | 4-C₈H₁₇-phenyl | 4-C₈H₁₇-phenyl |
| e-3 | 5,6-diCl | CH₃ | H | 2-benzothiazolyl | 2,3,4,6-tetramethylphenyl | COCH₃ |
| e-4 | 5-CH₃ | H | CN | H | 4-SO₃K-phenyl | 4-SO₃K-phenyl |
| e-5 | 5-NO₂ | CH₃ | H | SO₂CH₃ | 2,3-dimethylphenyl | 2,3,4,6-tetramethylphenyl | f-1, f-2 (structures shown)

The inkjet recording ink of the present invention (also referred to as "ink of the present invention") comprises at least one of the above-described azo dyes dissolved and/or dispersed in an aqueous medium and preferably contains the azo dye in an amount of 0.2 to 20 wt %, more preferably from 0.5 to 15 wt %. Also, solubility (or dispersion degree in stable state) of the dye in water at 20° C. is preferably 5 wt % or more, more preferably 10 wt % or more.

The magenta dye having the azo group for use in the present invention has an oxidation potential more positive than 1.0 V (vs SCE), preferably more positive than 1.1 V (vs SCE), particularly preferably more positive than 1.2 V (vs SCE) in the aqueous medium of the ink. In order to elevate the oxidation potential, there are selected from the above described preferred conditions, specifically, selection of dye structure having a chromophore represented by the following formula: (heterocyclic ring A)-N=N-(heterocyclic ring B), selection of an azo dye in which an aromatic nitrogen-containing 6-membered heterocyclic ring is bonded as a coupling component directly to at least one side of the azo group, selection of an azo dye having as an auxochrome, a structure containing an aromatic ring amino group or a heterocyclic amino group, and elimination of the α-hydrogen atom of the azo dye. Particularly, the dye represented by formula (1) exhibits the positive oxidation potential. Specifically, it is described in Japanese Patent Application No. 2001-254878.

The oxidation potential of azo dye is measured in the same manner as in the phthalocyanine dye described hereinafter.

With respect to the azo dye having an oxidation potential more positive than 1.0 V (vs SCE), another anti-oxidation criterion is an enforced discoloration rate constant to ozone gas. Preferred azo dye has the enforced discoloration rate constant of $5.0 \times 10^{-2}$ [hr$^{-1}$] or less, preferably $3.0 \times 10^{-2}$ [hr$^{-1}$] or less, more preferably $1.5 \times 10^{-2}$ [hr$^{-1}$] or less.

The enforced discoloration rate constant to ozone gas is determined as follows. An image is printed on a reflective image-receiving medium by using only the ink to be determined and the colored region having a color in the main spectral absorption region of the ink and having a reflection density of 0.90 to 1.10 as measured through a Status A filter is selected as the initial density point. The initial density is defined as the starting density (=100%). Then, the image is discolored by using an ozone discoloration tester capable of always keeping an ozone concentration of 5 mg/L, the time period until the density becomes 80% of the initial density is measured, a reciprocal [hour$^{-1}$] of the time period is determined and on the assumption that the relationship between the discoloration density and the time period follows the primary order rate formula, the value is used as the discoloration rate constant. Therefore, the discoloration rate constant obtained is a discoloration rate constant of the colored region printed with the ink, but the value is used as the discoloration rate constant of ink in the present invention.

The test print patch may be a patch obtained by printing a black square symbol of JIS code 2223, a stepwise color patch of Macbeth chart, or an appropriate stepwise density patch where the measured area can be obtained.

The reflection density of the reflection image (stepwise color patch) printed for measurement is a density determined with measurement light through a Status A filter by a densitometer satisfying the International Standard ISO5-4 (geometrical conditions of reflection density).

In the test chamber for the measurement of enforced discoloration rate constant to ozone gas, an ozone generator (for example, in a high-voltage discharge system of applying an alternating voltage to dry air) capable of constantly maintaining an internal ozone gas concentration of 5 mg/L is provided and the exposure temperature is controlled to 25° C.

The hue of the magenta ink is described below. As the magenta ink, that having λmax of 500 to 580 nm is excellent in view of the hue. Further, half widths of the longer wavelength side and shorter wavelength side of the maximum absorption wavelength are small, that is, a sharp absorption is preferred. Specifically, it is described in JP-A-2002-309133. Further, introduction of a methyl group into the a-position can realize sharpening of the absorption.

Now, the phthalocyanine dye used as the cyan dye in the present invention is described in more detail below.

The present inventors have made intensive investigations on the inkjet recording ink and found that the properties required of the dye are 1) to give a good hue and be free of change in the hue (solvate), 2) to exhibit excellent fastness (to light, ozone, NOx, solvent, oil and water), 3) to be safe (not carcinogenic by AMES, not irritating to skin and easily degradable), 4) to be inexpensive, 5) to have high $\epsilon$, 6) to be highly soluble, and 7) to have strong fixing property to media.

The properties required of the ink and conc. ink are 1) to be uniform irrespective of the temperature and aging, 2) to be less contaminated, 3) to exhibit good permeation to media, 4) to be uniform in the hitting size, 5) to be usable for all types of paper, 6) to be easily prepared, 7) to ensure no ejection error, less bubbling and easy defoaming, and 8) to be stably ejected.

The properties required of the image is 1) to be clear without blurring, discoloration and beading, 2) to have scratch resistance, 3) to have high and uniform gloss, 4) to have good image preservability and excellent balance in color fading, 5) to be quickly dried, 6) to be printed at a high speed, and 7) to have no image density dependency in the color fading ratio.

The properties required of the inkjet recording ink is to be excellent in both light fastness and ozone resistance and small in the change of hue and surface state (less generation of bronze and less precipitation of dye). With respect to the light fastness (OD1.0), the light fastness with TAC filter on Epson PM Photographic Image-Receiving Paper under Xe of 1.1 W/m (intermittent condition) is preferably 90% or more in terms of the residual color ratio for 3 days. Also, the dye remaining ratio for 14 days is preferably 85% or more. With respect to the ozone resistance, the ozone resistance (OD1.0) under condition of 5 ppm or less of ozone is preferably 60% or more, more preferably 70% or more, still more preferably 80% or more, in terms of the dye remaining ratio for one day. Also, the dye remaining ratio for 5 days is preferably 25% or more, more preferably 40% or more, still more preferably 50% or more. Samples varied in the amount of the dye coated are prepared by GTC and the amount of Cu element contained in the dye is measured by a fluorescent X ray.

The Cu ion is present in the form of a phthalate as a result of decomposition of a phthalocyanine dye. The amount of the salt present in an actual print is preferably 10 mg/m$^2$ or less in terms of Cu ion. The amount of Cu flowed out from the print is determined by forming an entire cyan solid image having a phthalate amount of 20 mg/m$^2$ or less in terms of Cu ion, discoloring the image with ozone and analyzing the amount of ion flowed out into water. Incidentally, all Cu compounds are trapped by the image-receiving material before the discoloration. The amount of ion flowed out into water is preferably 20% or less of all dyes.

It has been found by the present invention that a phthalocyanine dye having such properties can be obtained, for example, by 1) elevating the oxidation potential, 2) enhancing the aggregation property, 3) introducing an aggregation accelerating group, intensifying the hydrogen bond at the time of Π-Π stacking or 4) not incorporating a substituent at the α-position, that is, facilitating the stacking.

Conventional phthalocyanine dyes used for the inkjet ink are derived from an unsubstituted phthalocyanine through sulfonation and these are a mixture which cannot be specified in the number and positions of substituents. On the other hand, the dye for use in the inkjet recording ink of the present invention is a phthalocyanine dye which can be specified in the number and positions of substituents. The first structural feature is that the dye is a water-soluble phthalocyanine dye obtained by not passing through sulfonation of an unsubstituted phthalocyanine. The second structural feature is that the dye has an electron-withdrawing group at the βposition of a benzene ring of phthalocyanine, preferably at the β-position of all benzene rings. Specifically, useful dyes are those where a sulfonyl group is substituted (Japanese-Patent Application Nos. 2001-47013 and 2001-190214), a sulfamoyl group in general is substituted (Japanese Patent Application Nos. 2001-24352 and 2001-189982), a heterocyclic sulfamoyl group is substituted (Japanese Patent Application Nos. 2001-96610 and 2001-190216), a heterocyclic sulfonyl group is substituted (Japanese Patent Application Nos. 2001-76689 and 2001-190215), a specific sulfamoyl group is substituted (Japanese Patent Application No. 2001-57063), a carbonyl group is substituted (Japanese Patent Application No. 2002-12869)], or a specific substituent for enhancing the solubility or ink stability or preventing the bronzing, such as substituent having an asymmetric carbon (Japanese Patent Application No. 2002-12868) or Li salt (Japanese Patent Application No. 2002-12864), is substituted.

The first physical feature of the dye for use in the inkjet recording ink of the present invention is to have a high oxidation potential. The oxidation potential is preferably more positive than 1.00 V, more preferably more positive than 1.1 V, and most preferably more positive than 1.2 V. The second physical feature is to have a strong aggregation property. Specifically, the dye having the property includes those where the aggregation of oil-soluble dyes is defined (Japanese Patent Application No. 2001-64413) or the aggregation of water-soluble dyes is defined (Japanese Patent Application No. 2001-117350)].

With respect to the relationship between the number of aggregating groups and the performance (light absorbance of ink), when an aggregating group is introduced, reduction of light absorbance or shifting of Xmax λ to the shorter wave is liable to occur even in a dilute solution. With respect to the relationship between the number of aggregating groups and the performance (reflection OD on Epson PM920 Image-Receiving Paper), as the number of aggregating groups increases, the reflection OD at the same ion intensity more decreases. That is, the aggregation is considered to proceed on the image-receiving paper. With respect to the relationship between the number of aggregating groups and the performance (ozone resistance/light fastness), as the number of aggregating groups increases, the ozone resistance is more enhanced. A dye having a large number of aggregating groups tends to be enhanced also in the light fastness. In order to impart the ozone resistance, the above-described substituent X (which represents $X_1$, $X_2$, $X_3$, $X_4$ or the like) is preferably present. The reflection OD and the fastness are in the trade-off relationship and therefore, it is necessary to enhance the light fastness without weakening the aggregation.

Preferred embodiments of the ink (composition) of the present invention are:

1) a cyan ink where the light fastness with TAC filter on Epson PM Photographic Image-Receiving Paper under Xe of 1.1 W/m (intermittent condition) is 90% or more in terms of the residual color ratio for 3 days;

2) a cyan ink where after storage in an ozone environment of 5 ppm for 24 hours, the monochromatic site printed by using a monochrome (cyan) ink to give a cyan reflection density of 0.9 to 1.1 in a Status A filter has a dye remaining ratio (density after discoloration/initial density×100) of 60% (preferably 80%) or more;

3) a cyan ink where after ozone discoloration under the conditions of 2, the amount of Cu ion flowed out into water is 20% or less of all dyes; and 4) a cyan ink having permeability such that the amount of ink permeated into a specific image-receiving paper is 30% or more of the upper portion of the image-receiving layer.

The dye contained in the inkjet recording ink of the present invention is a phthalocyanine dye, preferably a water-soluble dye having an oxidation potential more positive than 1.0, more preferably a dye having fastness to ozone gas satisfying the above-described conditions, still more preferably the phthalocyanine dye represented by formula (I).

The phthalocyanine dye is a dye having fastness but the dye is known to be inferior in the fastness to ozone gas when used as a dye for inkjet recording.

In the present invention, an electron-withdrawing group is preferably introduced into the phthalocyanine skeleton to render the oxidation potential more positive than 1.0 V (vs SCE) and thereby reduce the reactivity with ozone which is an electrophilic agent. A more positive oxidation potential is more preferred and the oxidation potential is more preferably more positive than 1.1 V (vs SCE) and most preferably more positive than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho (Electrochemical Measuring Method)*, Gihodo Shuppan Sha (1984).

More specifically, a test sample is dissolved to a concentration of $1\times10^{-4}$ to $1\times10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. This value sometimes deviates on the order of tens of millivolt due to the effect of liquid junction potential, liquid resistance of sample solution, or the like, however, the reproducibility of potential can be guaranteed by adding a standard sample (for example, hydroquinone).

In order to univocally specify the potential, in the present invention, the value (vs SCE) measured in a dimethylformamide (concentration of dye: 0.001 mol $dm^{-3}$) containing 0.1 mol $dm^{-3}$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes more positive when an electron-withdrawing group is introduced, and becomes baser when an electron-donating group is introduced. In the present invention, the oxidation potential is preferably rendered more positive by introducing an electron-withdrawing group into the phthalocyanine skeleton so as to reduce the reactivity with ozone which is an electrophilic agent. When the Hammett's substituent constant σp value as a measure for the electron-withdrawing property or electron-donating property of substituent is used, the oxidation potential can be rendered more positive by introducing a substituent having a large σp value, such as sulfinyl group, sulfonyl group and sulfamoyl group.

For the purpose of such potential control, also, the phthalocyanine dye represented by formula (I) is preferably used.

The phthalocyanine dye having the above-described oxidation potential is apparently a cyanine dye excellent in both the light fastness and the ozone resistance, because this dye satisfies those conditions for light fastness and ozone resistance.

The phthalocyanine dye (preferably the phthalocyanine dye represented by formula (I)) for use in the present invention is described in detail below.

In formula (I), $X_1$, $X_2$, $X_3$ and $X_4$ each independently represents —SO-Z, —SO$_2$-Z, —SO$_2$NR1R2, a sulfo group, —CONR1R2 or —CO$_2$R1. Among these substituents, preferred are —SO-Z, —SO$_2$-Z, —SO$_2$NR1R2 and —CONR1R2, more preferred are —SO$_2$-Z and —SO$_2$NR1R2, and most preferred is —SO$_2$-Z. In the case where $a_1$ to $a_4$ showing the number of substituents each represents a number of 2 or more, a plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —SO$_2$-Z and Zs are different from each other, or may include substituents differing from each other, for example, —SO$_2$-Z and —SO$_2$NR1R2.

Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that both R1 and R2 are hydrogen atoms.

The substituted or unsubstituted alkyl group represented by R1, R2 and Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted with a halogen atom or an ionic hydrophilic group. The number of carbon atoms in the alkyl group does not contain carbon atoms of substituents and this is applied to other groups.

The substituted or unsubstituted cycloalkyl group represented by R1, R2 and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by R1, R2 and Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by R1, R2 and Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by R1, R2 and Z is preferably an aryl group having from 6 to 30 carbon atoms. Examples of the substituent include those described later as the substituent when Z, R1, R2, $Y_1$, $Y_2$, $Y_3$ and $Y_4$ can further have a substituent. In particular, an electron-withdrawing group is preferred because the dye can have a noble oxidation potential and be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by R1, R2 and Z is preferably a 5- or 6-membered ring and the ring may be further condensed. Also, the heterocyclic group may be an aromatic heterocyclic group or a non-aromatic heterocyclic group. Examples of the heterocyclic group represented by R1, R2 and Z are shown below in the form of a heterocyclic ring by omitting the substitution site. The substitution site is not limited and, for example, in the case of pyridine, the 2-position, 3-position and 4-position can be substituted. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, R1, R2, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

$Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, R1, R2, $Y_1$, $Y_2$, $Y_3$ and $Y_4$ each is a group which can further have a substituent, the group may further have the following substituents.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group and a cyclopentyl group), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutyl-carbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydro-pyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenyl-carbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (I) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include an ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred, and a lithium salt is particularly preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When $a_1$ to $a_4$ and $b_1$ to $b_4$ each represents a number of 2 or more, a plurality of substituents $X_1$, $X_2$, $X_3$, $X_4$, $Y_1$, $Y_2$, $Y_3$ or $Y_4$ may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having the structure represented by formula (II) described above is preferred. The phthalocyanine dye represented by formula (II) according to the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. $M_1$ has the same meaning as M in formula (I) and preferred examples are also the same.

In formula (II), $a_{11}$ to $a_{14}$ each independently represents an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —$SO_2$-Z and Zs are different from each other, or may include substituents different from each other, for example, —$SO_2$-Z and —$SO_2$NR1R2.

In the phthalocyanine dye represented by formula (II), the following combinations of substituents are particularly preferred.

$X_{11}$ to $X_{14}$ each independently represents preferably —SO-Z, —$SO_2$-Z, —$SO_2$NR1R2 or —CONR1R2, more preferably —$SO_2$-Z or —$SO_2$NR1R2, and most preferably —$SO_2$-Z.

Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

R1 and R2 each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that both R1 and $R_2$ are hydrogen atoms. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is more preferred that all are 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include an ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is particularly preferred because the solubility of dye and the stability of ink are enhanced.

As for the number of ionic hydrophilic groups, the phthalocyanine-base dye preferably contains at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described here. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo Co., Ltd. (1979).

Inevitably in view of the synthesis method, the phthalocyanine derivative represented by formula (I) is generally a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site. The positions of $Y_{11}$, $Y_{12}$, $Y_{13}$, $Y_{14}$, $Y_{15}$, $Y_{16}$, $Y_{17}$ and $Y_{18}$ in formula (II) are designated as 1, 4, 5, 8, 9, 12, 13 and 16, respectively.

(1) β-Position Substitution Type:
A phthalocyanine dye having specific substituents at the 2- and/or 3-position, the 6- and/or 7-position, the 10- and/or 11-position, and the 14- and/or 15-position.

(2) α-Position Substitution Type:
A phthalocyanine dye having specific substituents at the 1- and/or 4-position, the 5- and/or 8-position, the 9- and/or 12-position, and the 13- and/or 16-position.

(3) α,β-Position Mixed Substitution Type:
A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino—(Phthalocyanine— Chemistry and Function—)*, pp. 1-62, IPC, and C. C. Leznoff and A. B. P. Lever, *Phthalocyanines—Properties and Applications*, pp. 1-54, VCH, or methods analogous thereto.

The phthalocyanine compound represented by formula (I) of the present invention can be synthesized, for example, through sulfonation, sulfonyl chloridation or amidation of an unsubstituted phthalocyanine compound as described in International Publications 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those differing in the number of substituents or in the substitution site inevitably results. If the compound of the present invention is synthesized starting from such a product, the compound of the present invention is obtained as an α, β-position mixed substitution type mixture containing several kinds of compounds differing in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes more positive and the ozone resistance is increased. However, according to the above-described synthesis method, a phthalocyanine dye where the number of electron-withdrawing groups introduced is small, namely, the oxidation potential is more negative, is inevitably mingled. Therefore, in order to improve the ozone resistance, it is preferred to use a synthesis method where the production of a compound having a more negative oxidation potential is suppressed.

The phthalocyanine compound represented by formula (II) of the present invention can be synthesized, for example, by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III).

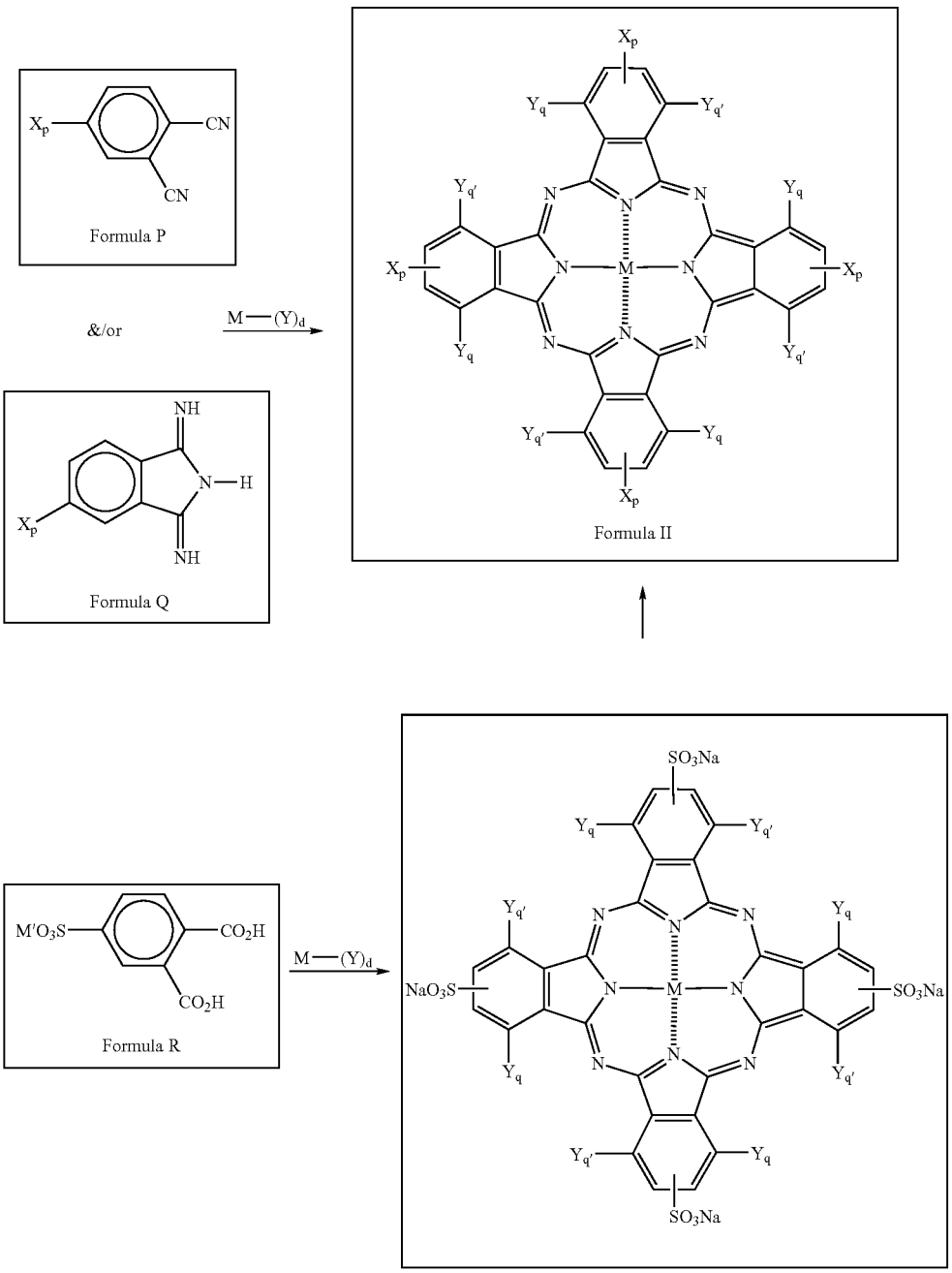

In the formulae above, $X_p$ corresponds to $X_{11}$, $X_{12}$, $X_{13}$ or $X_{14}$ in formula (II) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents a cation.

Examples of the cation represented by M' include alkali metal ions such as Li, Na and K, and organic cations such as triethylammonium ion and pyridinium ion. Formula (III):

$$M\text{-}(Y)_d$$

wherein M has the same meaning as M in formulae (I) and (II), Y represents a monovalent or divalent ligand such as halogen atom, acetate anion, acetylacetonate and oxygen, and d represents an integer of 1 to 4.

That is, according to the synthesis method described above, a specific number of desired substituents can be introduced. Particularly, in the case of introducing a large number of electron-withdrawing groups so as to render the oxidation potential more positive as in the present invention, the synthesis method is very excellent as compared with the method for synthesizing the phthalocyanine compound of formula (I) previously described.

The thus-obtained phthalocyanine compound represented by formulae (II) is usually a mixture of compounds represented by the following formulae (a)-1 to (a)-4 which are isomers with respect to the substitution site of each $X_p$, namely, a β-position substitution type.

Formula (a)-1

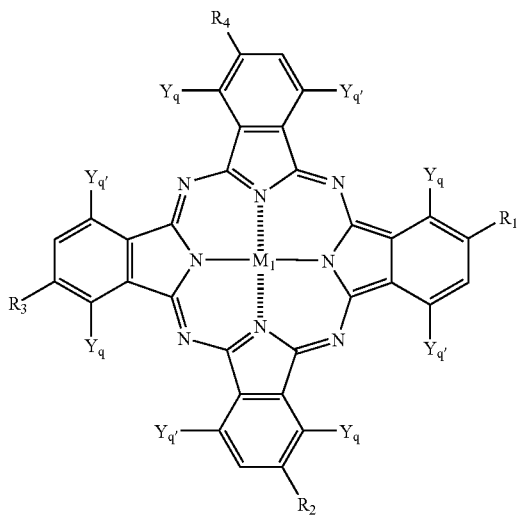

Formula (a)-2

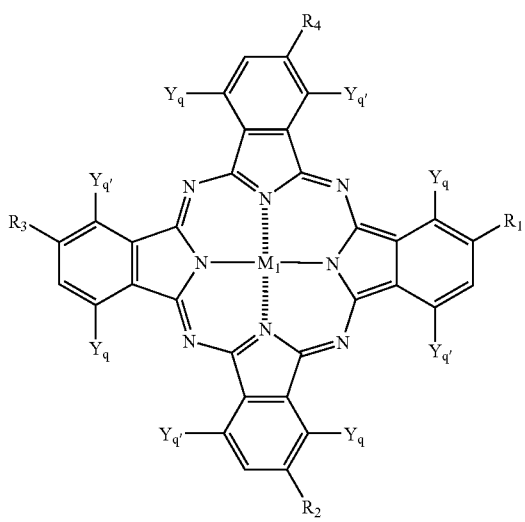

Formula (a)-3

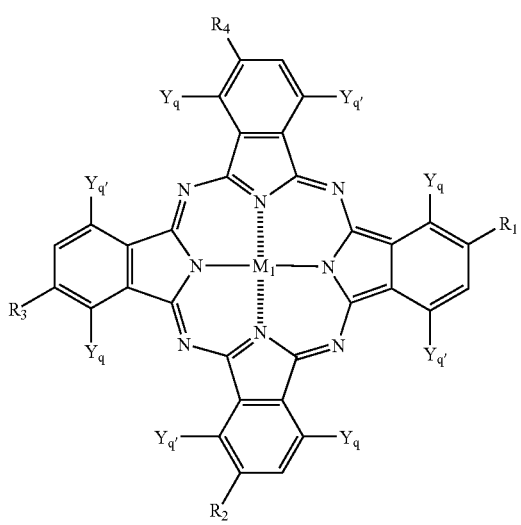

-continued

Formula (a)-4

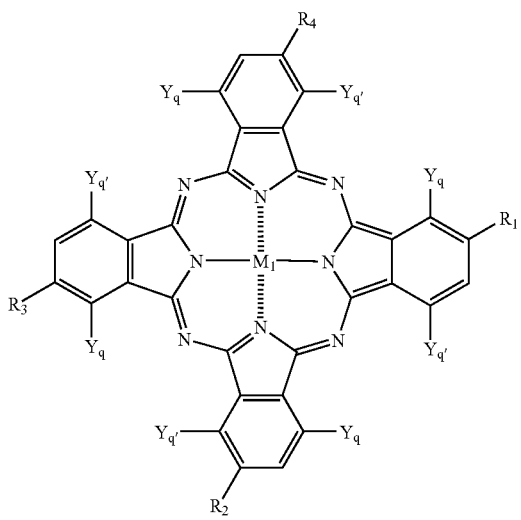

In the synthesis method described above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (II), the dyes having electron-withdrawing substituents different from each other are preferred because the solubility and aggregating property of dye and the stability of ink with the lapse of time can be controlled.

In the present invention, it has been found very important in any substitution type for the improvement of fastness that the oxidation potential is more positive than 1.0 V (vs SCE). The great effect thereof cannot be expected at all from the above-described related techniques. Furthermore, although the reason is not particularly clear, there is a tendency that the β-position substitution type is apparently more excellent in the hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, however, the phthalocyanine dye for use in the present invention is not limited to the following examples.

Compounds:
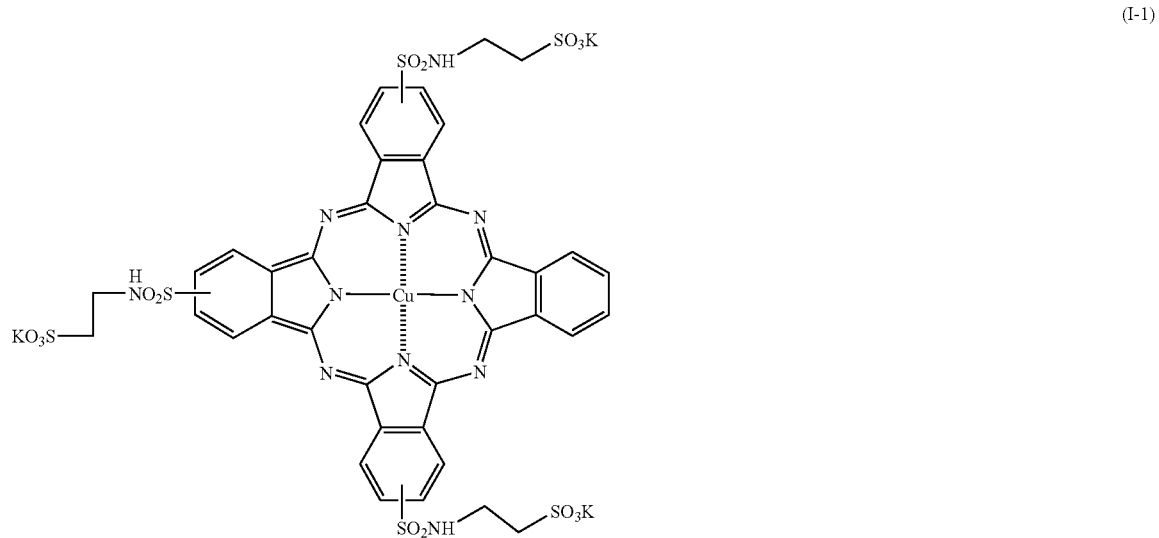
(I-1)
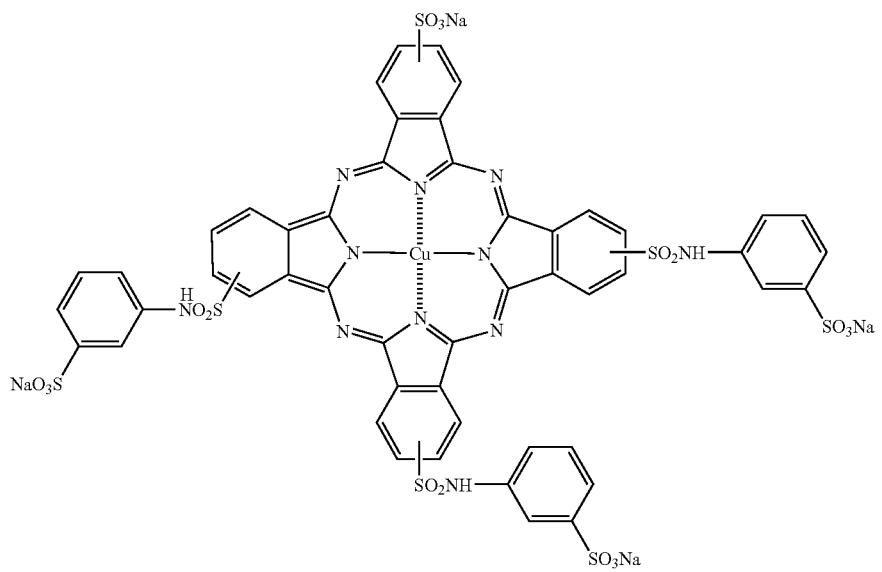
(I-2)

-continued
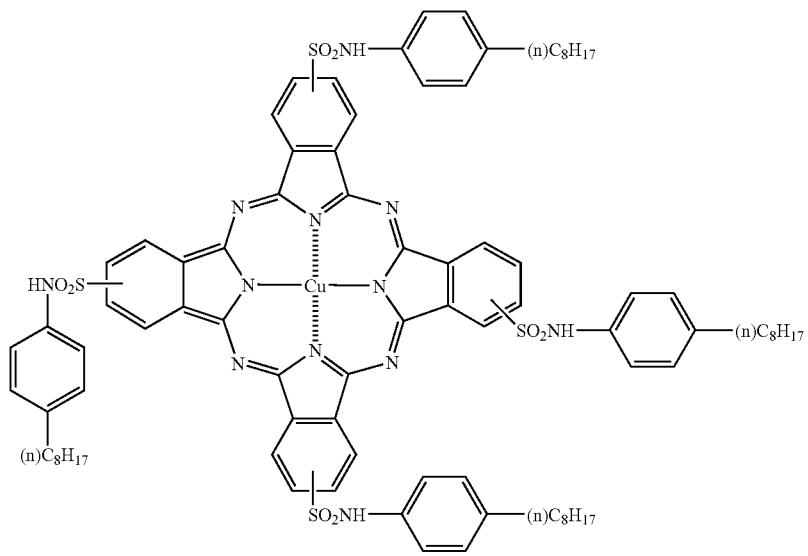
(I-3)
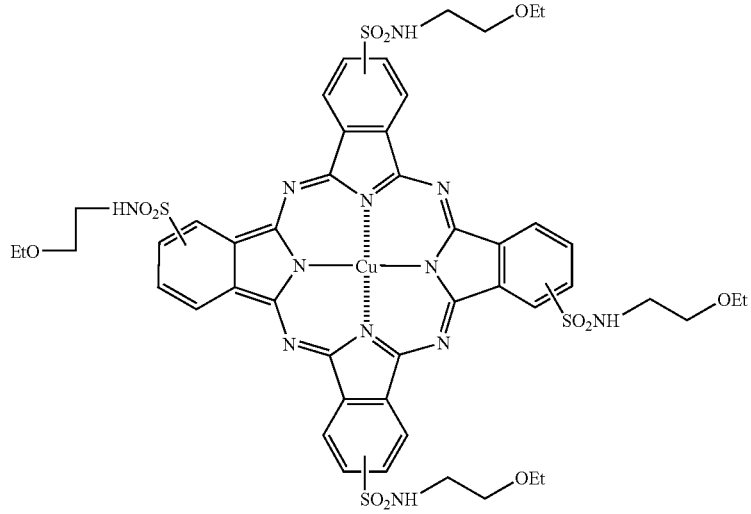
(I-4)

(I-5)
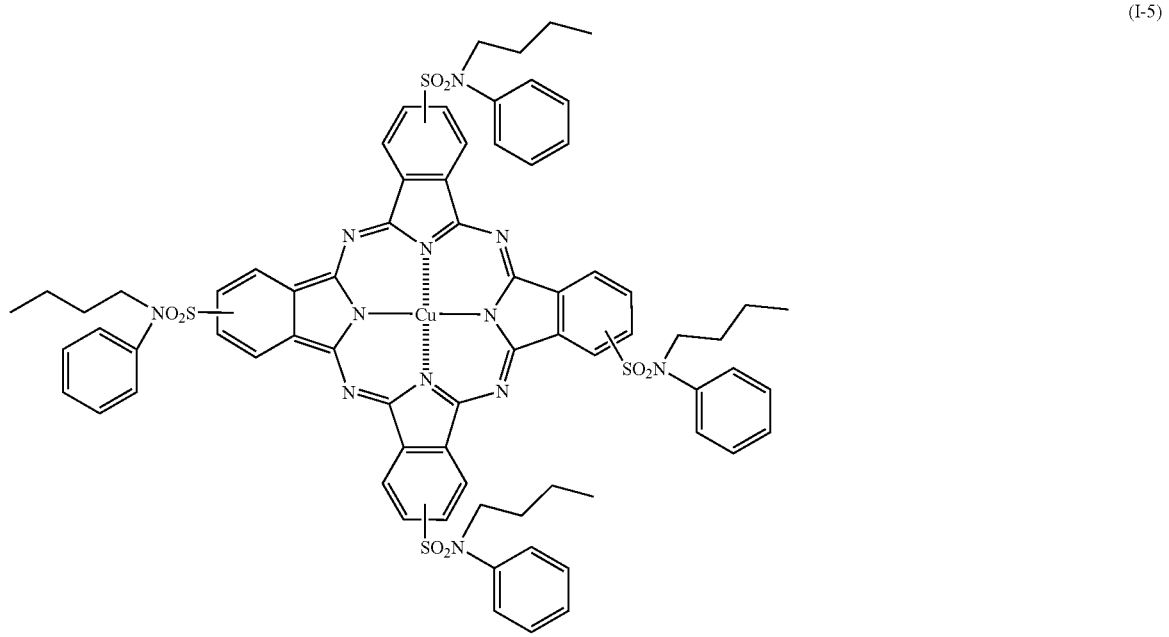
(I-6)
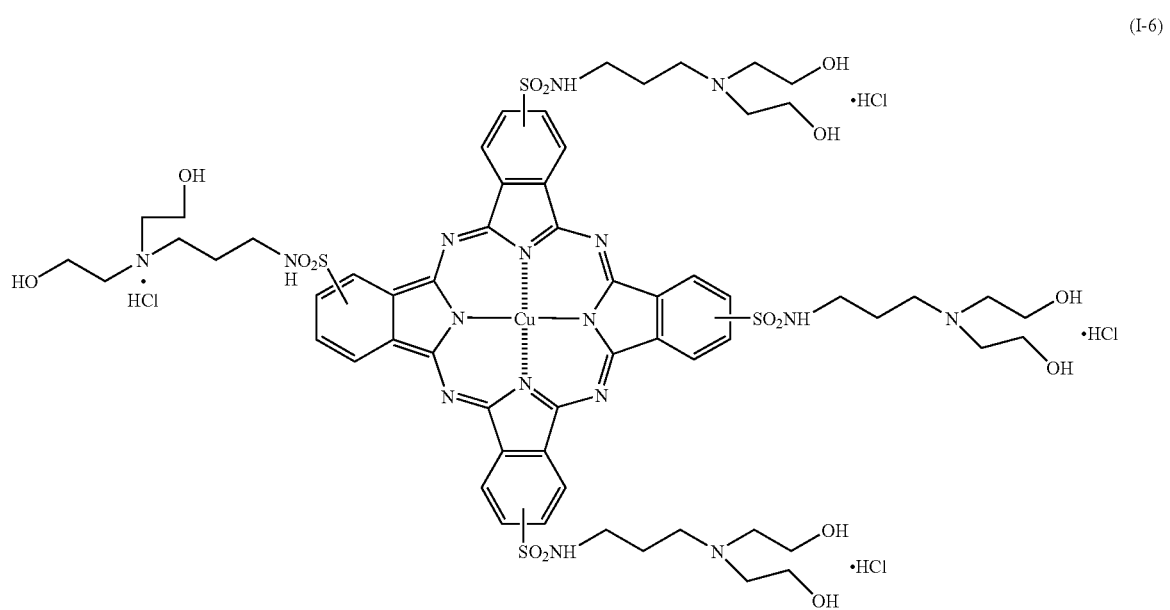

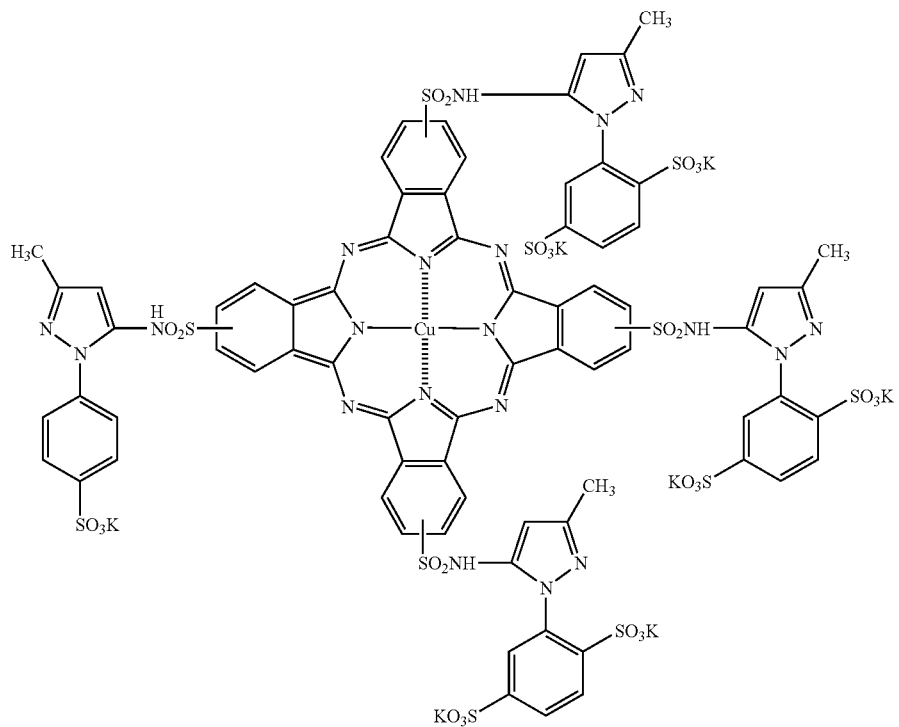
(I-7)
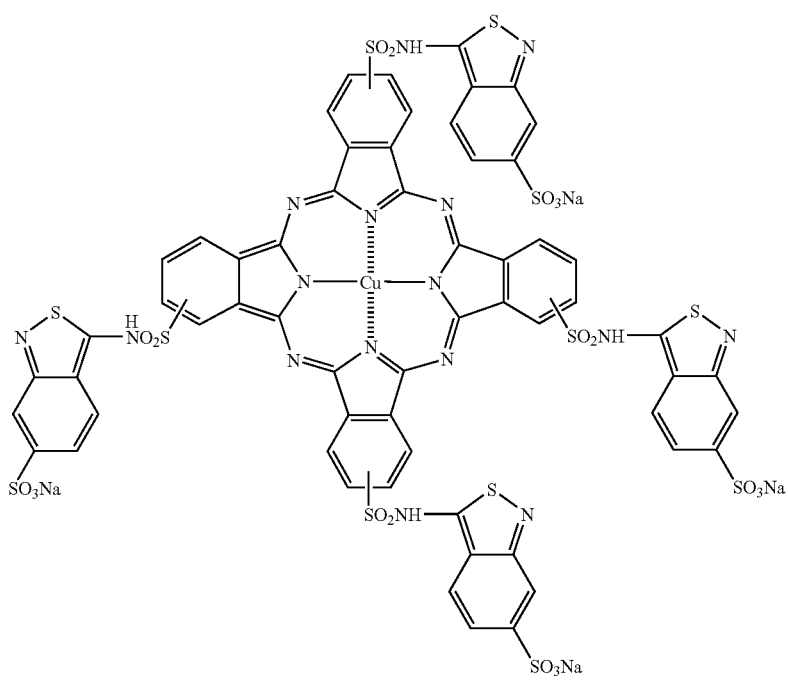
(I-8)

(I-9)
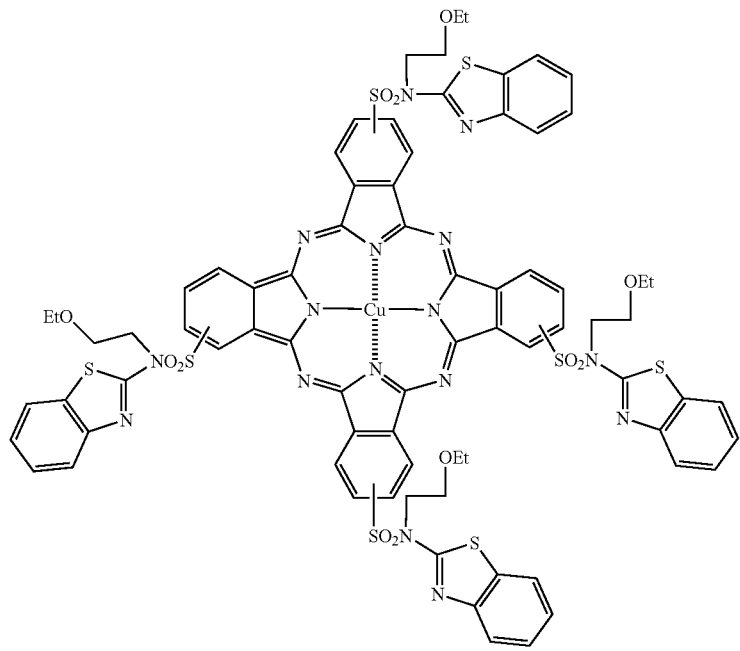
(I-10)
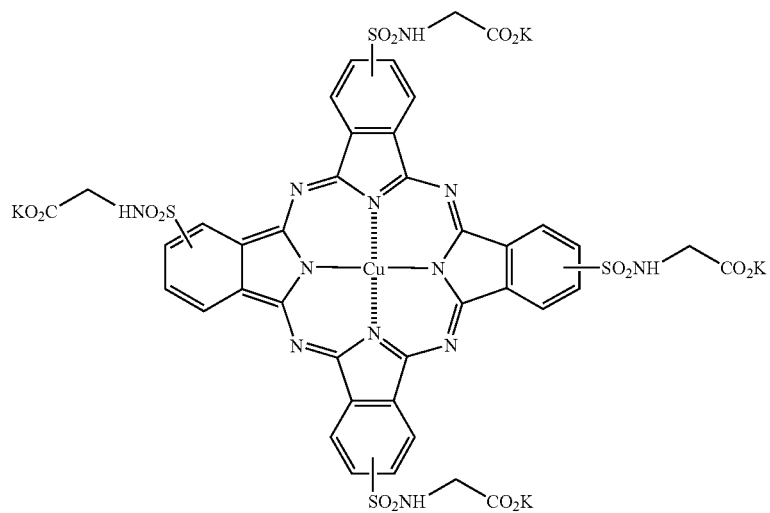

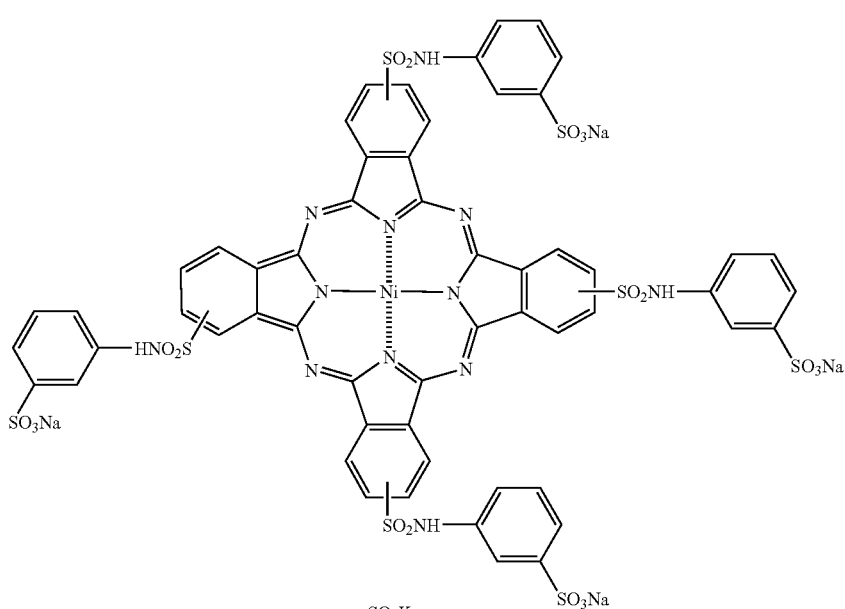
(I-11)
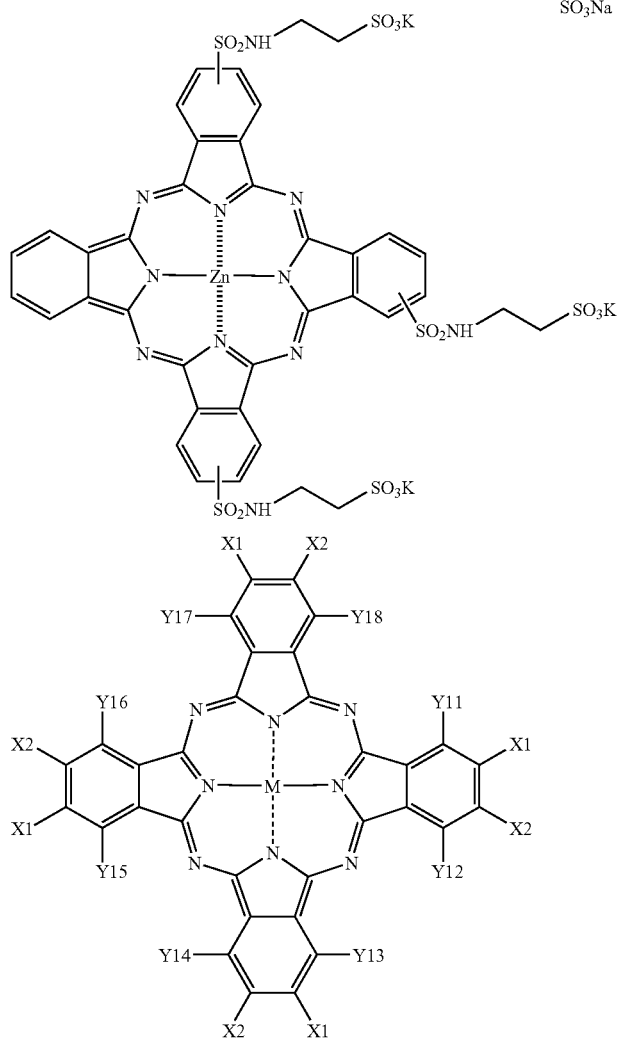
(I-12)
In the following tables, in the specific examples of pairs (X1, X2), (Y11, Y12), (Y13, Y14), (Y15, Y16) and (Y17, Y18), the positions of each of members of the given pair are exchangeable with each other.

| Compound No. | M | X1 | X2 | Y11, Y12 | Y13, Y14 | Y15, Y16 | Y17, Y18 |
|---|---|---|---|---|---|---|---|
| 101 | Cu | —SO₂—NH—CH₂—CH₂—SO₃Li | —H | —H, —H | —H, —H | —H, —H | —H, —H |
| 102 | Cu | —SO₂—NH—CH₂—CH(OH)—CO—NH—CH₂CH₂—SO₃Na | —H | —Cl, —H | —Cl, —H | —Cl, —H | —Cl, —H |
| 103 | Cu | —SO₂—NH—CH₂—CH₂—CH₂—SO₂NH—CH₂CH—SO₃Li | —H | —H, —H | —H, —H | —H, —H | —H, —H |
| 104 | Cu | —SO₂—NH—⟨C₆H₄⟩—SO₂NH—CH₂CH₂—SO₃Li | —H | —H, —H | —H, —H | —H, —H | —H, —H |
| 105 | Ni | —SO₂—NH—CH₂—CH₂—CO—NH—CH(CH₂—COONa)—COONa | —H | —Cl, —H | —Cl, —H | —Cl, —H | —Cl, —H |
| 106 | Cu | —SO₂—NH—CH₂—CH₂—SO₂—NH—CH₂—COONa | —CN | —H, —H | —H, —H | —H, —H | —H, —H |
| 107 | Cu | —SO₂—CH₂—CH₂—SO₂—NH—CH(CH₂—OH)—COOLi | —H | —H, —H | —H, —H | —H, —H | —H, —H |
| 108 | Cu | —SO₂CH₂—CH₂—CH₂—SO₃Li | —H | —H, —H | —H, —H | —H, —H | —H, —H |
| 109 | Cu | —SO₂—CH₂—CH₂—SO₃K | —H | —H, —H | —H, —H | —H, —H | —H, —H |
| 110 | Cu | —SO₂—(CH₂)₅—CO₂K | —H | —H, —H | —H, —H | —H, —H | —H, —H |
| 111 | Cu | —SO₂—NH—CH₂—CH₂—SO₂—NH—CH₂CH(OH)—CH₂—SO₃Li | —H | —H, —H | —H, —H | —H, —H | —H, —H |
| 112 | Cu | —SO₂—NH—CH₂—CH₂—SO₂NH—CH₂—CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |

-continued

| Compound No. | M | X1 | X2 | Y11, Y12 | Y13, Y14 | Y15, Y16 | Y17, Y18 |
|---|---|---|---|---|---|---|---|
| 115 | Cu | —SO$_2$NH(CH$_2$)$_3$N$^{\oplus}$(CH$_3$)(CH$_2$CH$_2$OH)$_2$·CH$_3$–C$_6$H$_4$–SO$_3^{\ominus}$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |
| 118 | Cu | —SO$_2$CH$_2$CH(CH$_3$)SO$_3$Li | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CHCH$_2$—CH$_3$ | | —H, —H | —H, —H | —H, —H | —H, —H |
| 125 | Cu | —SO$_2$CH$_2$CH$_2$CH$_2$SO$_2$—NH—CH$_2$—CH(CH$_3$)—CH$_2$—CH$_3$ | | —H, —H | —H, —H | —H, —H | —H, —H |

-continued

| Compound No. | M | X1 | X2 | Y11, Y12 | Y13, Y14 | Y15, Y16 | Y17, Y18 |
|---|---|---|---|---|---|---|---|
| 126 | Cu | —SO$_2$—CH$_2$—CH$_2$—CH(CH$_3$)—CO$_2$—CH$_2$—CH$_2$—O—CH$_3$ | —H | —H, —H | —H, —H | —H, —H | —H, —H |
| 127 | Cu | —SO$_2$CH$_2$CH$_2$SO$_2$NHCH$_2$CH$_2$OCH(CH$_3$)$_2$ | —H | —H, —H | —H, —H | —H, —H | —H, —H |
| 128 | Zn | —SO$_2$—CH$_2$—CH(OCH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_3$ | —H | —Cl, —H | —Cl, —H | —Cl, —H | —Cl, —H |
| 130 | Cu | —CO$_2$—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—SO$_2$—NH—CH(CH$_3$)—Ar(SO$_3$Li)$_2$ | —H | —H, —H | —H, —H | —H, —H | —H, —H |
| 132 | Cu | 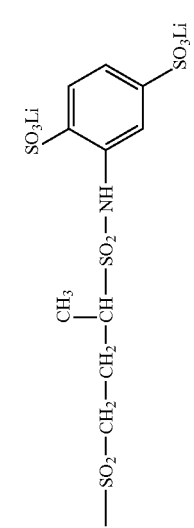 | —H | —H, —H | —H, —H | —H, —H | —H, —H |
| 133 | Cu |  | —H | —H, —H | —H, —H | —H, —H | —H, —H |

-continued
| Compound No. | M | X1 | X2 | Y11, Y12 | Y13, Y14 | Y15, Y16 | Y17, Y18 |
|---|---|---|---|---|---|---|---|
| 134 | Cu |  | —H | —H, —H | —H, —H | —H, —H | —H, —H |
| 135 | Cu | 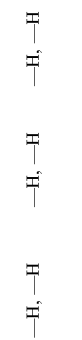 | —H | —H, —H | —H, —H | —H, —H | —H, —H |
| 136 | Cu | 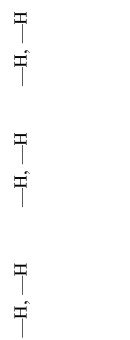 | —H | —H, —H | —H, —H | —H, —H | —H, —H |
| 137 | Cu | 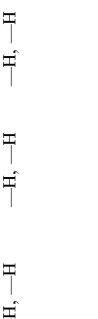 | —H | —H, —H | —H, —H | —H, —H | —H, —H |
| 138 | Cu | 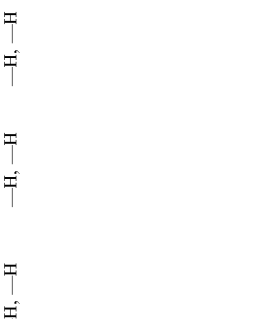 | —H | —H, —H | —H, —H | —H, —H | —H, —H |
| 139 | Cu |  | —Cl | —H, —H | —H, —H | —H, —H | —H, —H |

-continued

| Compound No. | M | X1 | X2 | Y11, Y12 | Y13, Y14 | Y15, Y16 | Y17, Y18 |
|---|---|---|---|---|---|---|---|
| 140 | Cu | —CO₂—CH₂CH₂CH₂—NH—⟨triazine with two NH—CH₂—CH₂—CH(CH₃)—SO₃Li substituents⟩ | —H | —H, —H | —H, —H | —H, —H | —H, —H |
| 141 | Cu | —SO₂NH—CH(COONa)—CH₂—CO—N—(CH₂CH₂OH)₂ | —H | —H, —H | —H, —H | —H, —H | —H, —H |
| 142 | Cu | —SO₂NH—⟨3-NHCO-phenyl⟩—⟨3-SO₃Li-phenyl⟩ | —H | —H, —H | —H, —H | —H, —H | —H, —H |
| 143 | Cu | —CO—NH—CH₂—CH(COOK)—CO—NH—CH(OH)—CH₂CH₂—SO₃K | —H | —H, —H | —H, —H | —H, —H | —H, —H |
| 144 | Cu | —SO₂—CH₂CH₂CH₂—NH—CO—⟨4-(CO—NH—CH(COOLi)—CH₂—COOLi)-phenyl⟩ | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

$M-Pc(X_{p1})_m(X_{p2})_n$

In the following tables, the introduction positions of the substituents $(X_{p1})$ and $(X_{p2})$ in each compound are exchangeable with each other in the β-position substitution type phthalocyanine dye.

| Compound No. | M | Xp₁ | m | Xp₁ | n |
|---|---|---|---|---|---|
| 146 | Cu | —SO₂—NH—CH₂—CH(CH₃)—SO₃Li | 3 | —SO₂—NH—CH₂—CH(OH)—CH₃ | 1 |
| 147 | Cu | —SO₂—NH—CH₂—CH₂SO₃Li | 3 | —SO₂—NH—CH₂—CH₂—SO₂—NH—CH₂—CH(OH)—CH₃ | 1 |
| 148 | Cu | —SO₂—NH—CH₂—CH(CH₃)—SO₃Li | 3 | —SO₂NH—CH₂—CH₂—SO₂—NH—CH₂—CH₂—O—CH₂—CH₂—OH | 1 |
| 149 | Cu | —SO₂—NH—CH₂—CH(CH₃)—SO₃Li | 2 | —SO₂—NH—CH₂—CH₂—CO—N(CH₂—CH₂—OH)₂ | 2 |
| 150 | Cu | —SO₂—NH—CH₂—CH(CH₃)—SO₃Li | 3 | —SO₂NH—CH(CH₃)—CH₂OH | 1 |
| 151 | Cu | —SO₂—NH—CH₂—CH₂—SO₂—NH—CH₂CH₂—COONa | 3 | —SO₂NH—CH₂—CH₂—O—CH₂—CH₂—OH | 1 |
| 152 | Cu | —SO₂NH—⟨C₆H₄⟩—CH(OH)—CH—SO₃Li | 2.5 | —SO₂—CH₂—CH₂—O—CH₂—CH₂—OH | 1.5 |
| 153 | Cu | —SO₂—CH₂—CH₂—CH(CH₃)—SO₃Na | 2 | —SO₂—CH₂—CH₂—CH₂—CO—N(CH₂—CH₂—OH)₂ | 2 |
| 154 | Cu | —SO₂—CH₂—CH₂—CH₂—SO₃Li | 3 | —SO₂—CH₂—CH₂—SO₂—NH—CH₂—CH(OH)—CH₃ | 1 |
| 155 | Cu | —SO₂—CH₂—CH₂—CH₂—COOK | 2 | —SO₂—CH₂—CH₂—SO₂—NH—CH₂—CH(OH)—CH₂—COOK | 2 |
| 156 | Cu | —SO₂—CH₂—CH₂—CH₂—SO₃Li | 3 | —SO₂—CH₂—CH(OH)—CH₂—SO₃Li | 1 |

-continued

| Compound No. | M | Xp₁ | m | Xp₁ | n |
|---|---|---|---|---|---|
| 157 | Cu | —SO₂—CH₂—CH₂—O—CH₂—CH₂—SO₃Li | 2 | —SO₂—CH₂—CH₂—CH₂—CO₂—CH₂—CH(OH)—CH₂—COOK | 2 |
| 158 | Cu | —SO₂—CH₂—CH(OH)—CH₂SO₃Li | 3 | —SO₂—CH₂—⟨C₆H₄⟩—SO₂NH—CH₂—CH(OH)—CH₂—OH | 1 |
| 159 | Cu | —SO₂NHCH₂—SO₃Li | 3 | —SO₂—CH₂—CH₂—SO₂—NH—CH₂—CH(OH)—CH₃ | 1 |
| 160 | Cu | —SO₂—CH₂—CH₂—O—CH₂—CH₂—O—CH₂—CH₂—SO₃Na | 3 | —SO₂—CH₂—CH₂—CH₂—CO—NH—CH(CH₂—COONa)—CH₂—COONa | 1 |
| 161 | Cu | —SO₂CH₂CH₂SO₃Li | 3 | —SO₂CH₂CH₂SO₂NHCH₂—CH(OH)—CH₂SO₃Li | 1 |
| 162 | Cu | —SO₂CH₂CH₂SO₃Li | 2 | —SO₂CH₂CH₂OCH₂CH₂OCH₂CH₂OH | 2 |
| 163 | Cu | —SO₂CH₂CH₂SO₃K | 3 | —SO₂CH₂CH₂CH₂SO₂NH—CH(CH₃)—CH₂—OH | 1 |
| 164 | Cu | —SO₂CH₂CH₂SO₃Li | 2 | —SO₂CH₂CH₂CH₂SO₂N(CH₂CH₂OH)₂ | 2 |
| 165 | Cu | —CO—NH—CH₂—CH₂—SO₃K | 3 | —CO—NH—CH₂—CH₂—O—CH₂—CH₂—OH | 1 |
| 166 | Cu | —CO—NH—CH₂—CH₂—SO₂—NH—CH₂—CH₂—COONa | 3 | —CO—NH—CH₂—CH(OH)—CH₃ | 1 |
| 167 | Cu | —SO₂(CH₂)₃SO₂NHCH₂—CH(OH)—CH₂CO₂Li | 2.5 | —CO—NH—CH₂—CH₂—CH₂—CO—N(—CH₂—CH₂—OH)₂ | 1.5 |
| 168 | Cu | —CO₂—CH₂—CH₂—CH(CH₃)—SO₃Na | 2 | —CO—CH₂—CH₂—CH₂—CO—N(—CH₂—CH₂—OH)₂ | 2 |
| 169 | Cu | —CO₂—CH₂—CH₂—CH₂—SO₃Li | 3 | —CO₂—CH₂—CH₂—CH₂—SO₂—NH—CH₂—CH(OH)—CH₃ | 1 |

-continued

| Compound No. | M | Xp₁ | m | Xp₁ | n |
|---|---|---|---|---|---|
| 170 | Cu | —CO$_2$—CH$_2$—CH$_2$—CH$_2$COOK | 2 | —CO$_2$—CH$_2$—CH$_2$—CH$_2$—SO$_2$—NH—CH$_2$—CH(OH)—CH$_2$—COOK | 2 |
| 171 | Cu | —CO$_2$—CH$_2$—CH$_2$—O—CH$_2$—CH$_2$—O—CH$_2$—CH$_2$—SO$_3$Na | 3 | —SO$_2$NH—CH$_2$—CH(OH)—CH$_2$—OH | 1 |
| 172 | Cu | —SO$_2$CH$_2$CH$_2$OCH$_2$CH$_2$O—CH$_2$CH$_2$SO$_3$K | 2 | —CO$_2$—CH$_2$—CH$_2$—CO$_2$—CH$_2$—CH(OH)—CH$_2$—COOK | 2 |
| 173 | Cu | —SO$_2$(CH$_2$)$_3$SO$_2$NHCH$_2$CHCH$_2$OH<br>            OH | 2 | —CO$_2$—CH$_2$—CH(OH)—CH$_2$—SO$_3$Li | 2 |
| 174 | Cu | —SO$_2$(CH$_2$)$_3$SO$_2$NHCH$_2$—CH—CH$_2$SO$_3$K<br>            OH | 3 | —CO$_2$—CH$_2$—CH$_2$—SO$_2$—NH—CH(OH)—CH—CH$_3$ | 1 |
| 175 | Cu | —SO$_2$(CH$_2$)$_3$SO$_2$NH(CH$_2$)$_3$N(CH$_2$CH$_2$OH)$_2$ | 2 | —CO$_2$—CH$_2$—CH(CH$_2$—CH$_2$—COOLi)—CO—NH—CH$_2$—COOLi | 2 |
| 176 | Cu | —SO$_2$—CH$_2$—CH$_2$—SO$_2$—NH—CH$_2$—CH(OH)—CH—CH$_3$ | 3 | —SO$_2$—CH$_2$—CH(CH$_2$CH$_3$)—CH$_2$CH$_2$—CH$_2$CH$_3$ | 1 |
| 177 | Cu | —SO$_2$—CH$_2$—CH$_2$—O—CH$_2$—CH$_2$—O—CH$_3$ | 2 | —SO$_2$—CH$_2$—CH$_2$—SO$_2$—NH—CH(OH)—CH—CH$_3$ | 1 |
| 178 | Cu | —SO$_2$—CH$_2$—CH$_2$—O—CH$_2$—CH$_2$—O—CH$_2$—CH$_2$—OH | 3 | —SO$_2$—CH$_2$—CH(CH$_2$CH$_3$)—CH$_2$CH$_2$—CH$_2$CH$_3$ | 1 |
| 179 | Cu | —SO$_2$—CH$_2$—CH(CH$_2$CH$_3$)—CH$_2$CH$_2$—CH$_2$CH$_3$ | 2 | —SO$_2$—CH$_2$—CH$_2$—SO$_2$—NH—CH(O—CH$_3$)—CH—CH$_3$ | 2 |
| 180 | Cu | —SO$_2$—CH$_2$—CH$_2$—SO$_2$—NH—CH(O—CH$_3$)—CH—CH$_3$ | 3 | —SO$_2$NH—CH$_2$—CH$_2$—SO$_2$NH—CH$_2$—CH$_2$—O—CH$_2$—CH$_2$—OH | 1 |

-continued

| Compound No. | M | Xp₁ | m | Xp₁ | n |
|---|---|---|---|---|---|
| 181 | Cu | —SO₂—CH₂—CH₂—CH₂—CO₂—NH—CH(CH₃)—CH₂—CH₃ | 3 | —SO₂—CH₂—CH₂—CH₂—SO₂—NH—CH(CH₃)₂ | 1 |
| 182 | Cu | —SO₂—CH₂—CH₂—SO₂NH—CH₂—CH(OH)—CH₂—CH₃ | 2.5 | —SO₂—CH₂—CH₂—CO₂—NH—CH(CH₃)—CH₂—CH₃ | 1.5 |
| 183 | Cu | —SO₂—CH₂—CH₂—CH₂—CO₂—NH—CH(CH₃)—CH₂—CH₃ | 2 | —SO₂—CH₂—CH₂—SO₂—NH—(CH₂)₃—CH₂—O—CH₂CH₂—OH | 2 |
| 184 | Cu | —SO₂—CH₂—CH₂—SO₂—NH—CH₂—CH(OH)—CH₂—CH₃ | 3 | —SO₂—CH₂—CH₂—O—CH₂—CH₂—O—CH₃ | 1 |
| 185 | Cu | —SO₂—CH₂—CH₂—SO₂—NH—CH₂—CH(OH)—CH₂—CH₃ | 3 | —SO₂—CH₂—CH₂—O—CH₂—CH₂—O—CH₂—CH₂—O—CH₃ | 1 |
| 186 | Cu | —SO₂—CH₂—CH₂—SO₂—NH—CH(CH₃)—CH₂—CH₃ | 3 | —SO₂—CH₂—CH₂—O—CH₂—CH₂—O—CH₂—CH₂—OH | 1 |
| 187 | Cu | —SO₂—CH₂—CH₂—SO₂—NH—CH(CH₃)₂ | 3 | —CO₂—CH₂—CH(CH₂CH₃)—CH₂—CH₂—CH₂CH₃ | 1 |
| 188 | Cu | —CO₂—CH₂—CH₂—CH₂—CO₂—NH—CH(CH₃)—CH₂—CH₃ | 3 | —CO₂—CH₂—CH₂—CH₂—O—CH₂—CH₂—O—CH₃ | 1 |
| 189 | Cu | —CO—NH—CH₂—CH₂—SO₂—NH—CH(CH₃)₂ | 3 | —SO₂—NH—CH₂—CH(CH₂CH₃)—CH₂—CH₂—CH₂—CH₃ | 1 |
| 190 | Cu | —CO—NH—CH₂—CH(CH₂CH₃)—CH₂—CH₂—CH₂CH₃ | 3 | —CO—NH—CH₂—CH₂—O—CH₂—CH₂—O—CH₃ | 1 |

The structure of the phthalocyanine compound represented by M–Pc($X_{p1}$)$_m$($X_{p2}$)n in Compound Nos. 146 to 190 is shown below:

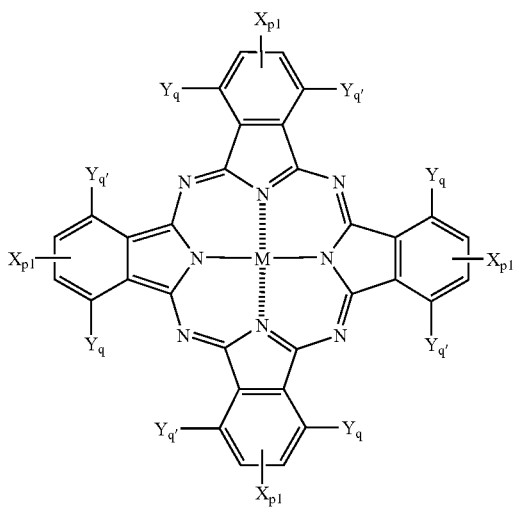

(wherein $X_{p1}$ each independently represents $X_{p1}$ or $X_{p2}$).

The phthalocyanine dye represented by formula (I) can be synthesized according to the patent publications described above. Furthermore, the phthalocyanine dye represented by formula (II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

The inkjet recording ink of the present invention (also simply referred to as "ink" in the present invention) comprises at least one of the above-described phthalocycnine dyes dissolved and/or dispersed in an aqueous medium and preferably contains the phthalocycnine dye in an amount of 0.2 to 20 wt %, more preferably 0.5 to 15 wt %.

In the ink of the present invention, other dyes and pigments may be used in combination with the above-described azo dyes and phthalocyanine dyes so as to provide a ink set for obtaining a full color image and adjust the color tone. Examples of the dye which can be used in combination include the following dyes.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro.nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo.thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Also, black dyes, for example, polyazo dyes can be used.

The water-soluble dye includes a direct dye, an acid dye, a food dye, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247;

C.I. Direct Violet 7, 9, 47, 48, 51, 66, 90, 93, 94, 95, 98, 100 and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397;

C.I. Acid Violet 5, 34, 43, 47, 48, 90, 103 and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326;

C.I. Acid Black 7, 24, 29, 48, 52:1 and 172;

C.I. Reactive Red 3, 13, 17, 19, 21, 22, 23, 24, 29, 35, 37, 40, 41, 43, 45, 49 and 55;

C.I. Reactive Violet 1, 3, 4, 5, 6, 7, 8, 9, 16, 17, 22, 23, 24, 26, 27, 33 and 34;

C.I. Reactive Yellow 2, 3, 13, 14, 15, 17, 18, 23, 24, 25, 26, 27, 29, 35, 37, 41 and 42;

C.I. Reactive Blue 2, 3, 5, 8, 10, 13, 14, 15, 17, 18, 19, 21, 25, 26, 27, 28, 29 and 38;

C.I. Reactive Black 4, 5, 8, 14, 21, 23, 26, 31, 32 and 34;
C.I. Basic Red 12, 13, 14, 15, 18, 22, 23, 24, 25, 27, 29, 35, 36, 38, 39, 45 and 46;
C.I. Basic Violet 1, 2, 3, 7, 10, 15, 16, 20, 21, 25, 27, 28, 35, 37, 39, 40 and 48;
C.I. Basic Yellow 1, 2, 4, 11, 13, 14, 15, 19, 21, 23, 24, 25, 28, 29, 32, 36, 39 and 40;
C.I. Basic Blue 1, 3, 5, 7, 9, 22, 26, 41, 45, 46, 47, 54, 57, 60, 62, 65, 66, 69 and 71; and
C.I. Basic Black 8.

As the pigment (including those called as dyes) which can be used in the present invention, commercially available pigments and known pigments described in various publications can be used. Examples of the publication include *Colour Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Publishing Co., Ltd. (1986), *Insatsu Ink Gijutsu* (*Printing Ink Technique*), CMC Publishing Co., Ltd. (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments, and inorganic pigments such as C.I. Pigment Yellow 34, 37, 42 and 53 which are yellow pigment, C.I. Pigment Red 101 and 108 which are red-type pigment, C.I. Pigment Blue 27, 29 and 17:1 which are blue-type pigment, C.I. Pigment Black 7 and magnetite which are black-type pigment, and C.I. Pigment White 4, 6, 18 and 21 which are white-type pigment.

The pigment having a color tone preferred for the formation of an image includes the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, and benzimidazolone-type C.I. Pigment Yellow 120, 151, 154, 156 and 180, and among these, those not using a benzidine-base compound as a raw material are more preferred), isoindoline-isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than those, an orange pigment (for example, C.I. Pigment Orange 13 and 16) and a green pigment (for example, C.I. Pigment Green 7) may be used.

The pigment which can be used in the present invention may be the above-described pigment which is not subjected to any treatment or is subjected to a surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo Co., ltd.;

(2) *Insatsu Ink Insatsu* (*Printing Ink Printing*), CMC Publishing Co., Ltd. (1984);

(3) *Saishin Ganryo Oyo Gijutsu* (*Newest Pigment Application Technology*), CMC Publishing Co., Ltd. (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. patents of (4) and capsulated pigments prepared by the method described in Japanese Patent Publications of (5) are effective, because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after dispersion, preferably from 0.01 to 10 μm, more preferably from 0.05 to 1 μm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Publishing Co., Ltd. (1986).

The magenta dye ink of the present invention has the features that the maximum reflection density is present in a range of from 530 to 580 nm and that reflection density at 600 nm is not more than 50% of the maximum reflection density. The maximum reflection density is more preferably in a range of from 540 to 570 nm. When the maximum reflection density is present in a range shorter than 530 nm, the hue of the magenta dye shifts yellowish, on the other hand, when it is present in a range longer than 580 nm, undesirable absorption in the cyan region increases, thus in both cases, the desired hue of the invention can not be obtained.

Also, in the magenta dye ink of the present invention, the reflection density at 600 nm is not more than 50%, preferably not more than 45%, more preferably not more than 20%, of the maximum reflection density. The ink having the reflection density at 600 nm not more than 50% of the maximum reflection density is excellent in color reproducibility even though the maximum reflection density shifts to a long wavelength side. When the value is more than 50%, the color reproducibility severely depredates.

The cyan dye ink of the present invention has the features that the maximum reflection density is present in a range of from 580 to 630 nm and that reflection density at 670 nm is not more than 90% of the maximum reflection density. The maximum reflection density is more preferably in a range of from 585 to 615 nm.

Also, in the cyan dye ink of the present invention, the reflection density at 670 nm is not more than 90%, preferably not more than 85%, more preferably not more than 65%, of the maximum reflection density. The ink having the reflection density at 670 nm not more than 90% of the maximum reflection density is excellent in ozone fastness. When the value is more than 90%, the ozone fastness decreases.

The reflection density and wavelength can be easily measured by a commercially available spectrophotometer. In the present invention, reflection absorption characteristics of the dye are determined by measuring with spectrophotometer V-560, and the above necessary data can be obtained. The measurement of reflection density is described in detail in JIS K-7653, etc.

The dye used in the present invention is substantially water-soluble or water-dispersible. The solubility of dye in water at 20° C. is preferably not less than 2 wt %, more preferably not less than 5 wt %. It is preferred to-use the water-soluble dye.

The ink of the present invention preferably has a conductivity of 0.01 to 10 S/m, more preferably from 0.05 to 5 S/m.

The conductivity can be measured by an electrode method using a commercially available saturated potassium chloride.

The conductivity can be controlled mainly by the ion concentration in an aqueous solution. In the case where the salt concentration is high, desalting can be performed by using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. Also, organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate can be used.

The conductivity can also be controlled by selecting the component of other additives.

The inkjet recording ink of the present invention can be prepared by dissolving and/or dispersing the dye in an aqueous medium. The term "aqueous medium" as used in the present invention means water or a mixture of water and a slight amount of water-miscible organic solvent, where additives such as surfactant, wetting agent, stabilizer and antiseptic are added, if desired.

In preparing the ink solution of the present invention, in the case of a water-soluble ink, the dye is preferably first dissolved in water and thereafter, various solvents and additives are added, dissolved and mixed to provide a uniform ink solution.

As the dissolving method, various methods such as stirring, ultrasonic irradiation and shaking can be used. Among these, stirring is preferred. In performing the stirring, various systems known in this field can be used, such as flow stirring and stirring utilizing the shearing force by means of a reversal agitator or a dissolver. Also, a stirring method utilizing the shearing force with the bottom surface of a container, such as magnetic stirrer, can be advantageously used.

Preparation methods of aqueous inkjet ink are described in detail in JP-A-5-148436, JP-A-5-295312, JP-A-7-97541, JP-A-7-82515, JP-A-118584 and Japanese Patent Application Nos. 2000-200780 and 2000-249799, and these are applied to the preparation of the inkjet recording ink of the present invention.

Examples of the water-miscible organic solvent (including a water-soluble organic solvent) which is preferably used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethyl-sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the above-described dye is an oil-soluble dye, the ink can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amyl-phenyl, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid and diphenylphosphoric acid). The high boiling point organic solvent can be used in an amount of, in terms of the weight ratio to the oil-soluble dye, from 0.01 to 3 times, preferably from 0.01 to 1.0 times.

The high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and/or the synthesis method of the high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225, 240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in an amount of, in terms of the weight ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may also be used at the emulsion-dispersion in view of emulsifiability. The low boiling point organic solvent is an organic solvent having a boiling point of about 30 to 150° C. at atmospheric pressure. Preferred examples thereof include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, anti-septic and fungicide, can be added, if desired.

In the ordinary emulsification method, an oil phase is added to an aqueous phase, however, a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after the emulsification, a water-soluble polymer may be added in combination with the surfactant. Preferred examples of the water-soluble polymer include polyvinyl alcohol, polyvinyl pyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains $—SO_3^-$ or $—COO^-$.

In the case of using this polymer which does not substantially dissolve in an aqueous medium, the polymer is preferably used in an amount of 20 wt % or less, more preferably 10 wt % or less, based on the high boiling point organic solvent.

In preparing an aqueous ink composition by dispersing the oil-soluble dye or high boiling point organic solvent according to emulsion-dispersion, control of the particle size is important. In order to elevate the color purity or density of an image formed by the inkjet recording, it is essential to reduce the average particle size. The average particle size is, in terms of the volume average particle size, preferably 1 µm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418. For example, the ink composition is diluted with distilled water to have a particle concentration of 0.1 to 1 wt %, then, the particle size can be easily measured by a commercially available volume average particle size measuring apparatus (for example, Microtrac UPA, manufactured by Nikkiso K. K.). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of the particles. The volume average particle size is described in Soichi Muroi, *Kobunshi Latex no Kagaku* (*Chemistry of Polymer Latex*), page 119, Koubunshikankoukai Co., Ltd.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and this seriously affects the printing performance. In order to prevent these troubles, it is important to reduce the number of particles having a particle size of 5 µm or more to 10 or less and the number of particles having a particle size of 1 µm or more to 1,000 or less, in 1 µl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, however, a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A. P. V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during the time period of filling the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. This removal of the low boiling point organic solvent is preferably performed as soon as possible immediately after the emulsification.

In the ink composition for inkjet recording obtained by the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor and pH adjusting agent, can be appropriately selected and used in an appropriate amount.

The drying inhibitor for use in the present invention is preferably a water-soluble organic solvent having a vapor pressure lower than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in an amount of 10 to 50 wt % in the ink.

Examples of the permeation accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator in the ink. The permeation accelerator is preferably used in an amount of causing no blurring of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compounds and benzoxazole-base compounds.

As the antioxidant which can be used in the present invention for improving the preservability of image, various organic or metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 wt % in the ink.

The fungicides are described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropyl-ammonium nitrite, pentaerythritol tetranitrate, dicyclohexylammonium nitrite and benzotriazole. The rust inhibitor is preferably used in an amount of 0.02 to 5.00 wt % in the ink.

The ink of the invention may contain a pH adjusting agent. The pH of the ink solution is preferably from 4 to 12, more preferably from 5 to 10, particularly preferably from 6 to 9.

Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include hydroxides of alkali metal (e.g., sodium hydroxide, lithium hydroxide, potassium hydroxide), carbonates of alkali metal (e.g., sodium carbonate, sodium hydrogencarbonate), and ammonium. Examples of the organic acid include acetic acid, propionic acid, trifluoroacetic acid and alkylsulfonic acid. Examples of the inorganic acid include hydrochloric acid, sulfuric acid and phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The ink of the present invention preferably has a viscosity at 25° C. of 1 to 30 mPa·s, more preferably from 2 to 15 mPa·s, still more preferably from 2 to 10 mPa·s. If the viscosity exceeds 30 mPa·s, the fixing rate of the recorded image decreases and the ejection performance also decreases, whereas if it is less than 1 mPa·s, the recorded image is blurred to decrease the grade.

The viscosity can be appropriately adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

The inkjet recording ink of the present invention is preferably has static surface tension at 25° C. of from 25 to 50 mN/m. Further, the dynamic surface tension thereof at 25° C. is 30 to 40 mN/m. When the static surface tension exceeds 50 mN/m, ejection stability and printing quality are seriously deteriorated, for example, blur at color mixing or feathering (for example, corded blur may occur from black letter, when the black letter is printed on the cyan solid image) is caused. On the other hand, if the static surface tension of ink is less than 25 mN/m, printing failure may occur due to, for example, attachment of ink to the hard surface at the ejection.

In the present invention, if desired, the above-described various cationic, anionic and nonionic surfactants can be used as the dispersant or dispersion stabilizer, and fluorine- or silicone-base compounds, chelating agents represented by EDTA, and the like can be used as the defoaming agent.

A recording material (preferably a recording paper and recording film) for use in the present invention is described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used. The thickness of the support is preferably from 10 to 250 μm and the basis weight is preferably from 10 to 250 g/m².

An image-receiving layer and a backcoat layer may be provided on the support as it is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process or a silicic acid hydrate obtained by a wet production process, but a silicic acid hydrate is preferred. These pigments may be used in combination of two or more thereof.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide and polyalkylene oxide derivatives, and water-dispersible polymers such as styrene butadiene latex and acryl emulsion. These aqueous binders may be used individually or in combination of two or more thereof. Among these, polyvinyl alcohol and silanol-modified polyvinyl alcohol are preferred in the present invention in view of adhesion to the pigment and peeling resistance of the image-receiving layer.

The image-receiving layer may contain a mordant, a water-proofing agent, a light fastness enhancer, a gas fastness enhancer, a surfactant, a hardening agent and other additives in addition to the pigment and the aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride, cation polyacrylamide and colloidal silica. Among these cationic resins, polyamidopolyamine epichlorohydrin is preferred. The content of the cationic resin is preferably from 1 to 15 wt %, more preferably from 3 to 10 wt %, based on the entire solid content of the ink-receiving layer.

Examples of the light fastness enhancer include zinc sulfate, zinc oxide, hindered amine-base antioxidants, and benzotriazole-base ultraviolet absorbents such as benzophenone. Among these, zinc sulfate is preferred.

The surfactant functions as a coating aid, a releasability improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The ink-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinyl pyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can be used for uses other than the inkjet recording, such as a material for display image, an image-forming material for interior decoration and an image-forming material for outdoor decoration.

Examples of the material for display image include various materials such as poster, wall paper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns by a dye, which can be acknowledged by a human, such as abstract design, letter and geometrical pattern.

Examples of the material for interior decoration include various materials such as wall paper, ornamental goods (e.g., ornament, doll), luminaire member, furniture member and design member of floor or ceiling. In the case of using the dye of the present invention as a material for forming an image, the image includes not only a strict image but also all patterns by a dye, which can be acknowledged by a human, such as abstract design, letter and geometrical pattern.

Examples of the material for outdoor decoration include various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

EXAMPLES

The present invention is described below by referring to Examples, however, the present invention is not limited thereto.

Example 1

Preparation of Ink Solution

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare a light magenta ink solution.

| (Composition of light magenta ink solution) | |
|---|---|
| Magenta Dye (Compound a-36) | 9.5 g |
| Diethylene glycol | 47 g |
| Urea | 37 g |
| Glycerin | 198 g |
| Triethylene glycol monobutyl ether | 105 g |
| 2-Pyrrolidone | 40 g |
| Triethanolamine | 7 g |
| Benzotriazole | 0.07 g |
| BROXEL XL2 (produced by Zeneca) | 5.0 g |
| Surfactant (w-1) | 6 g |

Also, a magenta ink, a light cyan ink, a cyan ink, a yellow ink, a dark yellow ink and a black ink were prepared by changing the dye species and additives to prepare Ink Set 101 shown in the table below.

With respect to reflection density of the ink, a sample of magenta solid image print was prepared and the sample was measured by spectrophotometer V-560 produced by JASCO to determine the reflection density. A wavelength at the maximum reflection density and a ratio of reflection density at 600 nm to the maximum reflection density were obtained. The reflection absorption characteristics of the magenta solid image of Ink Set 101 are shown in FIG. 1.

| | Light Cyan | Cyan | Light Magenta | Magenta | Yellow | Dark Yellow | Black |
|---|---|---|---|---|---|---|---|
| Dye (g/liter) | A-2 17.5 | A-2 68.0 | a-36 9.5 | a-36 30.2 | A-3 14.0 | A-3 10.0 | A-5 20.0 |
| | | | | | A-4 14.0 | A-4 10.0 | A-6 39.0 |
| | | | | | | A-2 13.0 | A-7 17.0 |
| | | | | | | | A-3 20.0 |
| Diethylene glycol (g/liter) | 167 | 110 | 47 | 76 | 85 | — | 20 |
| Urea (g/liter) | — | — | 37 | 46 | — | — | — |
| Glycerin (g/liter) | 164 | 148 | 198 | 150 | 154 | 147 | 120 |

-continued
|  | Light Cyan | Cyan | Light Magenta | Magenta | Yellow | Dark Yellow | Black |
|---|---|---|---|---|---|---|---|
| Triethylene glycol monobutyl ether (g/liter) | 125 | 132 | 105 | 107 | 130 | 127 | — |
| Diethylene glycol monobutyl ether | — | — | — | — | — | — | 23.0 |
| 2-Pyrrolidone (g/liter) | — | 20 | 40 | — | — | — | 80 |
| Surfactant (g/liter) | 10 | 10 | 6 | 12 | 3 | 3 | 5 |
| Triethanolamine (g/liter) | 6.5 | 10 | 7 | 7 | 1 | 1 | 18 |
| Benzotriazole (g/liter) | 0.07 | 0.09 | 0.07 | 0.08 | 0.06 | 0.08 | 0.08 |
| Proxel XL2 (g/liter) | 1.0 | 4.0 | 5.0 | 4.5 | 3 | 5 | 4 |
Deionized water was added to make 1 liter.
A-1
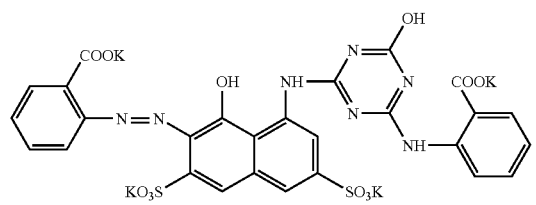
A-2
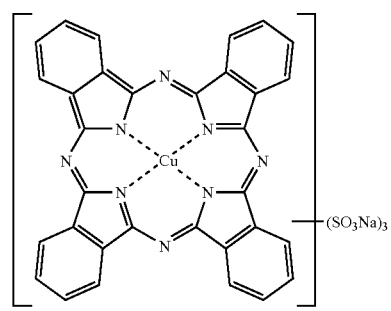
A-3
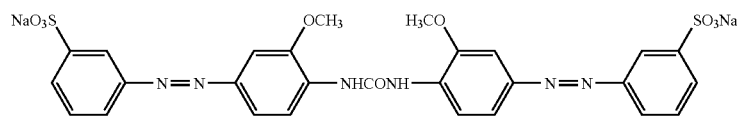
A-4
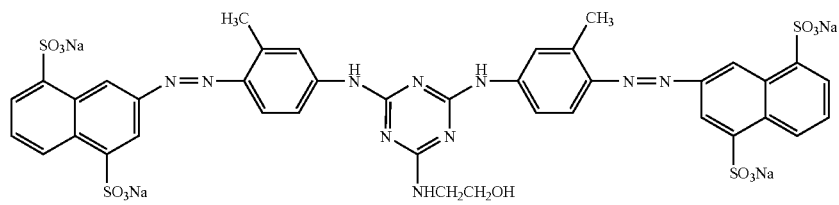
A-5
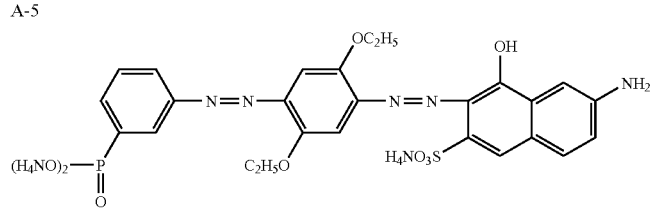

-continued

| | Light Cyan | Cyan | Light Magenta | Magenta | Yellow | Dark Yellow | Black |
|---|---|---|---|---|---|---|---|

A-6

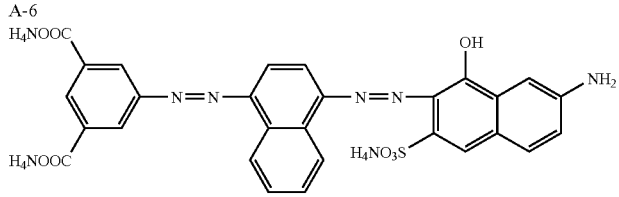

A-7

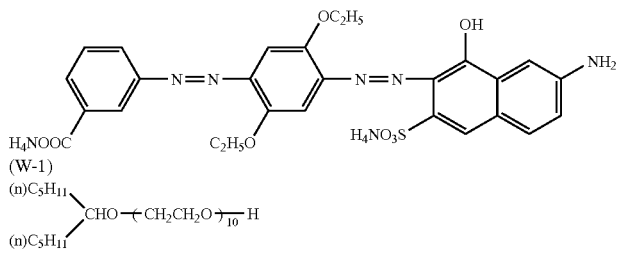

(W-1)

(n)C$_5$H$_{11}$\
    CHO—(CH$_2$CH$_2$O)$_{\overline{10}}$—H\
(n)C$_5$H$_{11}$/

Ink Sets 102 to 106 were produced in the same manner as above except for changing the dye species with respect to the light magenta ink and magenta ink in Ink Set 101.

| Ink Set | Light Magenta | Magenta | Wavelength at Maximum Reflection Density (nm) | Ratio of Reflection Density at 600 nm to Maximum Reflection Density | Remarks |
|---|---|---|---|---|---|
| 101 | a-36 | a-36 | 557 | 10 | Invention |
| 102 | a-38 | a-38 | 559 | 13 | Invention |
| 103 | a-37 | a-37 | 560 | 10 | Invention |
| 104 | Genuine Ink Produced by EPSON (PM-920C) | Genuine Ink Produced by EPSON (PM-920C) | 523 | 19 | Comparison |
| 105 | A-1 | A-1 | 520 | 22 | Comparison |
| 106 | b-5 | b-5 | 560 | 61 | Comparison |

(Ink Jet Recording)

Ink sets 101 to 106 prepare above each was filled in cartridges of inkjet printer PM920C (produced by Seiko Epson Corporation) and an image was printed by the printer on inkjet paper Photo Gloss Paper EX produced by Fuji Photo Film Co., Ltd. The image obtained was subjected to the following evaluations.

(1) Printing Performance 1

The cartridges were sent on the printer and after confirming that the ink was ejected through all nozzles, printing was conducted on 20 sheets of A4 size paper, thereby evaluating disturbance of printing.

A: Disturbance of printing did not occur from the beginning to the end of printing B: Sheets having disturbance of printing occurred C: Disturbance of printing occurred from the beginning to the end of printing (2) Printing Performance 2

The cartridges were allowed to stand at 60° C. for 2 days and then the disturbance of printing was evaluated in the same manner as in Printing Performance 1.

(3) Hue

The image was visually evaluated as follows.

○: Good hue

X: Somewhat poor level

Δ: Poor level

Regarding evaluation of image preservability described below, print samples of yellow, magenta, cyan and black were prepared and evaluated in the following manner.

(4) Light Fastness

Image density (Ci) of the sample just after the printing was measured by X-rite 310TR. The sample was irradiated with xenon light (85,000 lux) using Weather-O-Meter (produced by Atlas Electric Co., Ltd.) for 7 days and then image density (Cf) of the sample was measured to determine a dye remaining ratio (Cf/Ci×100), whereby the light-fastness was evaluated. The dye remaining ratios were determined at 3 points having the image density (Ci) of 1, 1.5 and 2 respectively, and a case wherein the dye remaining ratios were not less than 85% at all three points was designated as A, a case wherein the dye remaining ratio were less than 85% at two points was designated as B and a case wherein the dye remaining ratio were less than 85% at all three points was designated as C.

(5) Heat Fastness

Density of the sample was measured by X-Rite 310TR before and after preservation of the sample under conditions of 80° C. and 70 to 80% RH for 7 days and a dye remaining ratio was determined, whereby the heat fastness was evaluated. The dye remaining ratios were determined at 3 points having the image density (Ci) of 1, 1.5 and 2 respectively, and a case wherein the dye remaining ratios were not less than 90% at all three points was designated as A, a case wherein the dye remaining ratios were less than 90% at two points was designated as B and a case wherein the dye remaining ratios were less than 90% at all three points was designated as C.

(6) Ozone Gas Fastness

Density of the sample was measured by X-rite 310TR before and after allowing to stand in a box set 0.5 ppm of ozone gas concentration for 7 days and a dye remaining ratio was determined. The dye remaining ratios were determined at 3 points having the image density (Ci) of 1, 1.5 and 2 respectively, and a case wherein the dye remaining ratios were not less than 80% at all three points was designated as A, a case wherein the dye remaining ratio was less than 80% at one or two points was designated as B and a case wherein the dye remaining ratios were less than 70% at all three points was designated as C.

The results obtained are shown in the following table.

| Ink Set | Printing Performance 1 | Printing Performance 2 | Light Fastness | Heat Fastness | Ozone Gas Fastness | Hue | Remarks |
|---|---|---|---|---|---|---|---|
| 101 | A | A | A | A | A | ○ | Invention |
| 102 | A | A | A | A | A | ○ | Invention |
| 103 | A | A | A | A | A | ○ | Invention |
| 104 | A | A | B | B | C | ○ | Comparison |
| 105 | A | A | B | B | C | ○ | Comparison |
| 106 | A | A | B | B | C | X | Comparison |

From the results shown in the table, it is apparent that when the ink of the present invention is used in ink jet recording, excellent preservability is achieved comparison with the comparison example. In particular, the ink exhibits excellent performance in the ozone gas fastness. From the evaluation of printing performance, it is also seen that the ink exhibits good ejection stability.

Further, ink having reflection density at 600 nm higher than 50% of the maximum reflection density is clearly undesirable in the hue as a magenta dye.

When the image-receiving paper used in the present invention was changed to PM Photographic Paper produced by Seiko Epson Corporation or PR101 produced by Canon Inc., the same effects as in the results above were confirmed.

Example 2

The same inks as prepared in Example 1 were filled in cartridges of Inkjet Printer BJ-F850 (produced by Canon Inc.) and an image was printed by the printer on inkjet paper Photo Gloss Paper EX produced by Fuji Photo Film Co., Ltd. As a result of the evaluations in the same manner as in Example 1, the same results as in Example 1 were obtained. When the image-receiving paper was changed to PM Photographic Paper produced by Seiko Epson Corporation or PR101 produced by Canon Inc., the same effects were confirmed.

Example 3

Preparation of Ink Solution

Deionized water was added to the following components to make 1 liter and the resulting solution was stirred for 1 hour under heating at 30 to 40° C. Thereafter, the solution was filtered under reduced pressure through a microfilter having an average pore size of 0.25 µm to prepare a light cyan ink solution.

| (Composition of light cyan ink solution) | |
|---|---|
| Cyan Dye (Compound No. 154) | 17.5 g |
| Diethylene glycol | 167.0 g |
| Glycerin | 164.0 g |
| Triethylene glycol monobutyl ether | 125.0 g |
| Triethanolamine | 6.5 g |
| Benzotriazole | 0.07 g |
| BROXEL XL2 (produced by Zeneca) | 3.5 g |
| Surfactant (w-1) | 10 g |

Also, a magenta ink, a light magenta ink, a cyan ink, a yellow ink, a dark yellow ink and a black ink were prepared by changing the dye species and additives to prepare Ink Set 201 shown in the table below.

Figure 2:
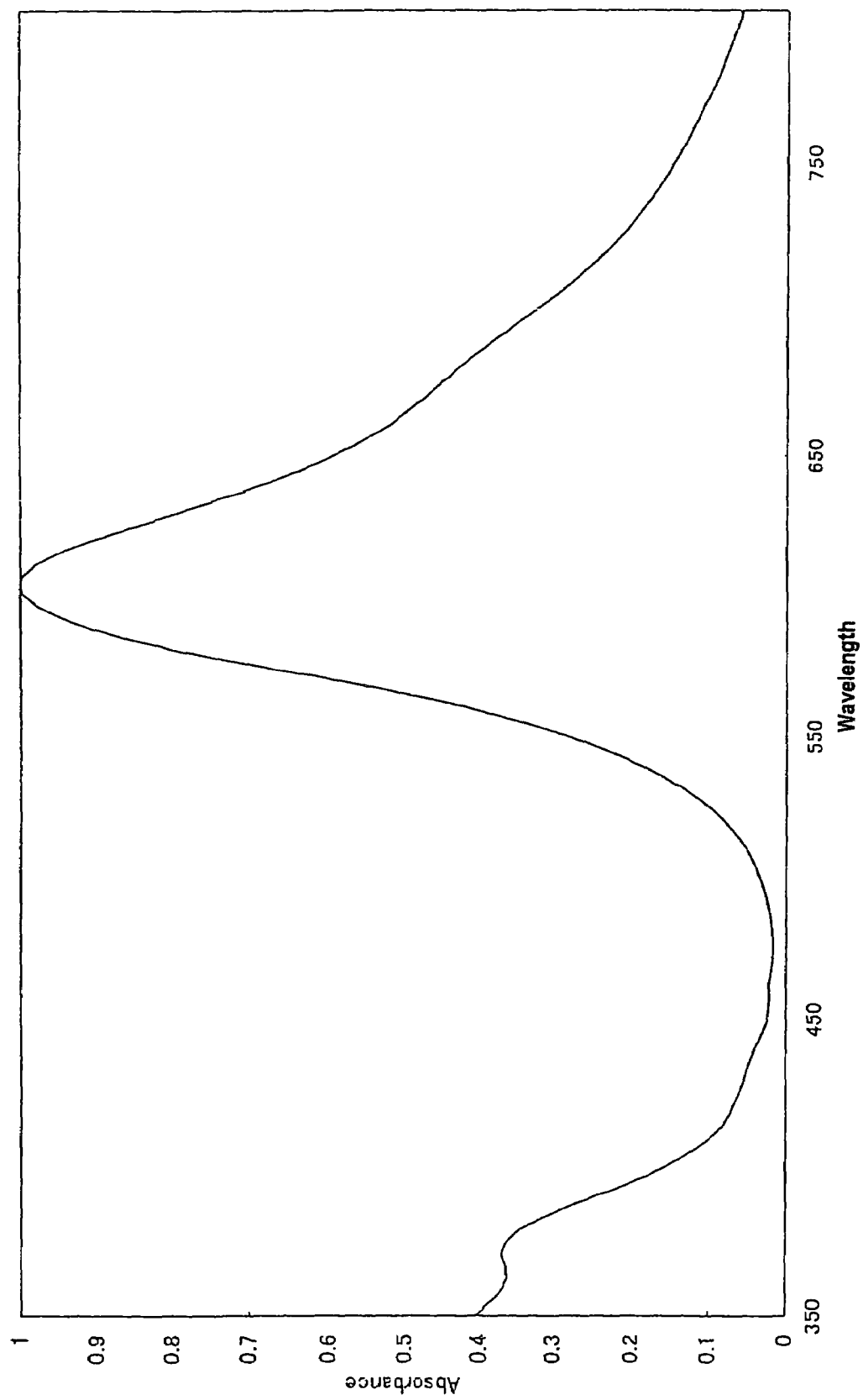
FIG. 2. is a diagram showing reflection absorption characteristics of a cyan solid image of Ink Set 201.

With respect to reflection density of the ink, a sample of magenta solid image print was prepared and the sample was measured by spectrophotometer V-560 produced by JASCO to determine the reflection density. A wavelength at the maximum reflection density and a ratio of reflection density at 670 nm to the maximum reflection density were obtained. The reflection absorption characteristics of the cyan solid image of Ink Set 201 are shown in FIG. 2.

| | Light Cyan | Cyan | Light Magenta | Magenta | Yellow | Dark Yellow | Black |
|---|---|---|---|---|---|---|---|
| Dye (g/liter) | 154 | 154 | A-1 10.2 | A-1 30.8 | A-3 14.0 | A-3 10.0 | A-5 20.0 |
| | 17.5 | 68.0 | | | A-4 14.0 | A-4 10.0 | A-6 39.0 |
| | | | | | A-2 13.0 | | A-7 17.0 |
| | | | | | | | A-3 20.0 |
| Diethylene glycol (g/liter) | 167 | 110 | 47 | 76 | 85 | — | 20 |
| Urea (g/liter) | — | — | 37 | 46 | — | — | — |
| Glycerin (g/liter) | 164 | 148 | 198 | 150 | 154 | 147 | 120 |
| Triethylene glycol monobutyl ether (g/liter) | 125 | 132 | 105 | 107 | 130 | 127 | — |
| Diethylene glycol monobutyl ether | — | — | — | — | — | — | 230 |
| 2-Pyrrolidone (g/liter) | — | 20 | 40 | — | — | — | 80 |
| Surfactant (g/liter) | 10 | 10 | 6 | 12 | 3 | 3 | 5 |

-continued

| | Light Cyan | Cyan | Light Magenta | Magenta | Yellow | Dark Yellow | Black |
|---|---|---|---|---|---|---|---|
| Triethanolamine (g/liter) | 6.5 | 10 | 7 | 7 | 1 | 1 | 18 |
| Benzotriazole (g/liter) | 0.07 | 0.09 | 0.07 | 0.08 | 0.06 | 0.08 | 0.08 |
| Proxel XL2 (g/liter) | 1.0 | 4.0 | 5.0 | 4.5 | 3 | 5 | 4 |

Deionized water was added to make 1 liter.

In the table, A-1 to A-7 and Surfactant (W-1) are the same as in Example 1 respectively.

Ink Sets 202 to 206 were produced in the same manner above except for changing the dye species with respect to the light cyan ink and cyan ink in Ink Set 101.

| Ink Set | Light Cyan | Cyan | Wavelength at Maximum Reflection Density (nm) | Ratio of Reflection Density at 670 nm to Maximum Reflection Density | Remarks |
|---|---|---|---|---|---|
| 201 | 154 | 154 | 609 | 63 | Invention |
| 202 | 108 | 108 | 610 | 70 | Invention |
| 203 | 155 | 155 | 610 | 75 | Invention |
| 204 | Genuine Ink Produced by EPSON (PM-920C) | Genuine Ink Produced by EPSON (PM-920C) | 622 | 92 | Comparison |
| 205 | A-2 | A-2 | 677 | 97 | Comparison |
| 206 | I-10 | I-10 | 628 | 95 | Comparison |

(Ink Jet Recording)

Ink sets 201 to 206 prepare above each was filled in cartridges of inkjet printer PM920C (produced by Seiko Epson Corporation) and an image was printed by the printer on inkjet paper Photo Gloss Paper EX produced by Fuji Photo Film Co., Ltd. The image obtained was subjected to the following evaluations.

Printing performance 1, Printing performance 2, and the evaluation of hue were conducted in the same manner as in Example 1.

The evaluations of image preservability (light fastness, heat fastness and ozone gas fastness) were conducted in the same manner as in Example 1. The results obtained are shown in the following table.

| Ink Set | Printing Performance 1 | Printing Performance 2 | Light Fastness | Heat Fastness | Ozone Gas Fastness | Hue | Remarks |
|---|---|---|---|---|---|---|---|
| 201 | A | A | A | A | A | ○ | Invention |
| 202 | A | A | A | A | A | ○ | Invention |
| 203 | A | A | A | A | A | ○ | Invention |
| 204 | A | A | B | B | B | ○ | Comparison |
| 205 | A | A | A | B | C | ○ | Comparison |
| 206 | A | A | A | B | C | ○ | Comparison |

From the results shown in the table, it is apparent that when the ink of the present invention is used in ink jet recording, excellent preservability is achieved comparison with the comparison example. In particular, the ink exhibits excellent performance in the ozone gas fastness. From the evaluation of printing performance, it is also seen that the ink exhibits good ejection stability.

Further, ink, which does not have the maximum reflection density in the range of from 580 to 630 nm, is clearly undesirable in the hue as a cyan dye.

When the image-receiving paper used in the present invention was changed to PM Photographic Paper produced by Seiko Epson Corporation or PR101 produced by Canon Inc., the same effects as in the results above were confirmed.

Example 4

The same inks as prepared in Example 3 were filled in cartridges of Inkjet Printer BJ-F850 (produced by Canon Inc.) and an image was printed by the printer on inkjet paper Photo Gloss Paper EX produced by Fuji Photo Film Co., Ltd. As a result of the evaluations in the same manner as in Example 1, the same results as in Example 1 were obtained. When the image-receiving paper was changed to PM Photographic Paper produced by Seiko Epson Corporation or PR101 produced by Canon Inc., the same effects were confirmed.

ADVANTAGE OF THE INVENTION

According to the invention, an inkjet recording ink, which is excellent in ejection stability, provides an image having good hue, excellent preservability and high image quality and maintains the performances under sever conditions, and an inkjet recording method can be provided.

INDUSTRIAL APPLICABILITY

The ink of the present invention is used without any limitation in the inkjet recording system and is used for a known system, for example, an electric charge controlling system of ejecting an ink utilizing the electrostatic induction force, a drop-on-demand system (pressure pulse system) utilizing an oscillation pressure of a piezoelectric element, an acoustic inkjet system of converting electric signals into acoustic beams, irradiating the beams on an ink and ejecting the ink by utilizing the radiation pressure, and a thermal inkjet (bubble jet) system of heating an ink to form a bubble and utilizing the generated pressure.

The inkjet recording system includes a system of ejecting a large number of small-volume ink droplets of a so-called photo ink having a low concentration, a system of improving an image quality by using a plurality of inks having substantially the same hue but differing in the concentration, and a system using a colorless transparent ink, and the ink of the present invention can be used in any of these systems.

The invention claimed is:

1. An inkjet recording ink comprising at least one magenta dye dissolved and/or dispersed in an aqueous medium, wherein a wavelength ($\lambda$max) at the maximum reflection density of the ink is in a specific wavelength range ($\lambda$ex) and a reflection density at the specific wavelength ($\lambda$er) longer than the $\lambda$max is not more than x % of the maximum reflection density, the $\lambda$ex is from 530 to 580 nm, $\lambda$er is 600 nm and x is 50, and the magenta dye is an azo dye represented by the following formula (1) having an absorption maximum in a spectral range of from 500 to 580 nm in the aqueous medium and an oxidation potential more than 1.0 V(vs SCE):

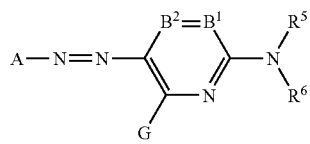

Formula (1)

wherein A represents a 5-membered heterocyclic group,
B$^1$ and B$^2$ each represents =CR$^1$— or —CR$^2$= or either one of B$^1$ and B$^2$ represents a nitrogen atom and the other represents =CR$^1$— or —CR$^2$=, R$^5$ and R$^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, the hydrogen atom of each substituent may be substituted, G, R$^1$ and R$^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxy-carbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, the hydrogen atom of each substituent may be substituted, and R$^1$ and R$^{5,}$ or R$^5$ and R$^6$ may combine to form a 5- or 6-membered ring.

2. The inkjet recording ink as claimed in claim 1, wherein the $\lambda$ex is from 540 to 570 nm, $\lambda$er is 600 nm and x is 45.

3. The inkjet recording ink as claimed in claim 2, wherein the $\lambda$ex is from 540 to 570 nm, $\lambda$er is 600 nm and x is 20.

4. The inkjet recording ink as claimed in claim 1, wherein the azo dye is an azo dye having as an auxochrome, a structure containing an aromatic cyclic amino group or a heterocyclic amino group.

5. The inkjet recording ink as claimed in claim 1, wherein the azo dye is an azo dye having a steric structure.

6. The inkjet recording ink as claimed in claim 1, wherein an ozone discoloration resistance rate constant of a recording image is not more than $5.0\times10^{-2}$ [hr$^{-1}$].

7. An inkjet recording method comprising conducting image recording by a inkjet printer using the inkjet recording ink as claimed in claim 1.

8. The inkjet recording method as claimed in claim 7, which comprises ejecting an ink droplet comprising the inkjet recording ink according to recording signals on an image-receiving material comprising a support having thereon an image-receiving layer containing a white inorganic pigment particle to record an image on the image-receiving material.

9. An inkjet recording ink comprising at least one cyan dye dissolved and/or dispersed in an aqueous medium, wherein a wavelength ($\lambda$max) at the maximum reflection density of the ink is in a specific wavelength range ($\lambda$ex) and a reflection density at the specific wavelength ($\lambda$er) longer than the $\lambda$max is not more than x % of the maximum reflection density, and the $\lambda$ex is from 580 to 630 nm, $\lambda$er is 670 nm and x is 90, and the cyan dye is a phthalocyanine dye represented by the following formula (I):

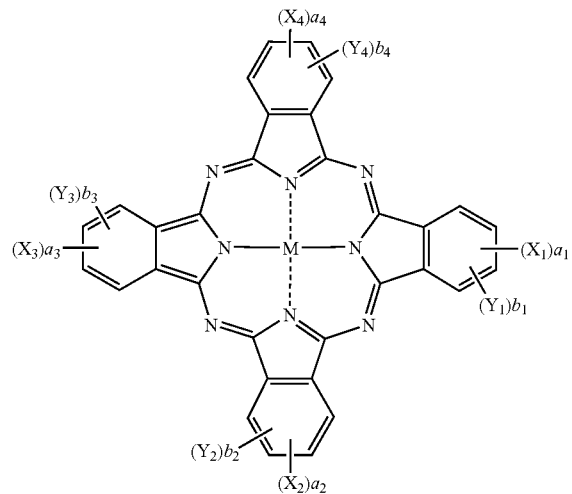

wherein $X_1$, $X_2$, $X_3$ and $X_4$ each independently represents —SO-Z, —SO$_2$-Z, —SO$_2$NR1R2, a sulfo group, —CONR1R2 or —CO$_2$R1, Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, the Zs may be the same or different, $Y_1$, $Y_2$, $Y_3$ and $Y_4$ each independently represents a monovalent substituent, provided that when a plurality of substituents $X_1$, $X_2$, $X_3$, $X_4$, $Y_1$, $Y_2$, $Y_3$ or $Y_4$ are present, the $X_1$s, $X_2$s $X_3$s, $X_4$s, $Y_1$s, $Y_2$s, $Y_3$s or $Y_4$s may be the same or different, $a_1$ to $a_4$ and $b_1$ to $b_4$ number of substituents $X_1$ to $X_4$ and $Y_1$ to $Y_4$, respectively, $a_1$ to $a_4$ each independently represents an integer of 0 to 4, provided that all are not 0 at the same time, $b_1$ to $b_4$ each independently represents an integer of 0 to 4, and M represents a hydrogen atom, a metal atom or an oxide, hydroxide or halide thereof.

10. The inkjet recording ink as claimed in claim 9, wherein the λex is from 585 to 615 nm, λer is 670 nm and x is 85.

11. The inkjet recording ink as claimed in claim 10, wherein the λex is from 585 to 615 nm, λer is 670 nm and x is 65.

12. The inkjet recording ink as claimed in claim 9, wherein the dye is a water-soluble phthalocyanine dye having an oxidation potential more positive than 1.0 V.

13. The inkjet recording ink as claimed in claim 9, wherein after storage in an ozone environment of 5 ppm for 24 hours, the monochromatic site printed by using a monochrome (cyan) ink to give a cyan reflection density of 0.9 to 1.1 by a Status A filter has a dye remaining ratio (density after discoloration/initial density×100) 60% or more.

14. The inkjet recording ink as claimed in claim 13, wherein after the ozone discoloration, an amount of Cu ion flowed out into water is 20% or less of all dyes.

15. The inkjet recording ink as claimed in claim 9, wherein the phthalocyanine dye is a water-soluble phthalocyanine dye having an electron-withdrawing group at a β-position of a benzene ring of the phthalocyanine.

16. The inkjet recording ink as claimed in claim 9, wherein the phthalocyanine dye is a water-soluble phthalocyanine dye produced by a method not passing through sulfonation of an unsubstituted phthalocyanine.

17. The inkjet recording ink as claimed in claim 9, wherein the dye represented by formula (I) is a dye represented by the following formula (II):

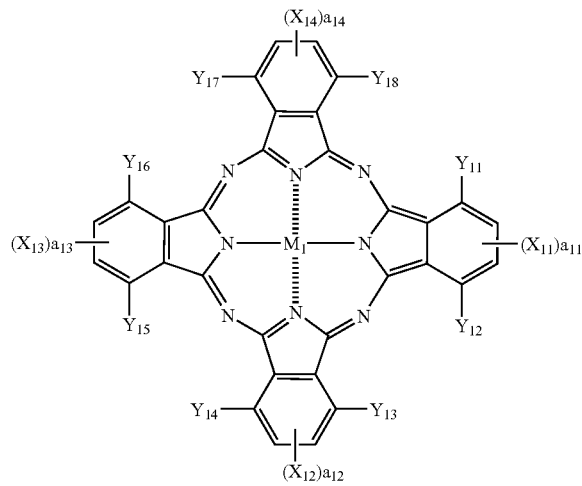

wherein $X_{11}$ to $X_{14}$, $Y_{11}$ to $Y_{18}$ and $M_1$ have the same meanings as $X_1$ to $X_4$, $Y_1$ to $Y_4$ and M in formula (I), respectively, and $a_{11}$ to $a_{14}$ each independently represents an integer of 1 or 2.

18. An inkjet recording method comprising conducting image recording by a inkjet printer using the inkjet recording ink as claimed in claim 9.

19. The inkjet recording method as claimed in claim 18, which comprises ejecting an ink droplet comprising the inkjet recording ink according to recording signals on an image-receiving material comprising a support having thereon an image-receiving layer containing a white inorganic pigment particle to record an image on the image-receiving.

* * * * *